(12) United States Patent
Amaki et al.

(10) Patent No.: US 11,436,136 B2
(45) Date of Patent: Sep. 6, 2022

(54) MEMORY SYSTEM INCLUDING NON-VOLATILE BUFFER AND CONTROL METHOD THEREOF

(71) Applicant: Kioxia Corporation, Minato-ku (JP)

(72) Inventors: Takehiko Amaki, Yokohama (JP);
Toshikatsu Hida, Yokohama (JP);
Shunichi Igahara, Kamakura (JP);
Yoshihisa Kojima, Kawasaki (JP);
Suguru Nishikawa, Osaka (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 16/807,275

(22) Filed: Mar. 3, 2020

(65) Prior Publication Data
US 2021/0073119 A1    Mar. 11, 2021

(30) Foreign Application Priority Data
Sep. 10, 2019    (JP) .............................. JP2019-164847

(51) Int. Cl.
*G06F 12/02*    (2006.01)
*G06F 3/06*    (2006.01)

(52) U.S. Cl.
CPC ........ *G06F 12/0246* (2013.01); *G06F 3/0616* (2013.01); *G06F 3/0656* (2013.01); *G06F 3/0659* (2013.01); *G06F 3/0679* (2013.01); *G06F 2212/1044* (2013.01)

(58) Field of Classification Search
CPC .... G06F 3/0616; G06F 3/0656; G06F 3/0659; G06F 3/0679; G06F 12/0246; G06F 2212/1044; G06F 3/0613; G06F 2212/7201; G06F 2212/7205; G06F 2212/7208
See application file for complete search history.

(56) References Cited

U.S. PATENT DOCUMENTS

| | | | |
|---|---|---|---|
| 8,886,877 B1 * | 11/2014 | Avila .................. | G06F 12/0638 711/103 |
| 9,846,542 B2 | 12/2017 | Seo et al. | |
| 9,928,169 B2 | 3/2018 | Romanovsky et al. | |
| 2009/0089486 A1 * | 4/2009 | Cheung ............... | G06F 12/0246 711/103 |
| 2016/0062885 A1 * | 3/2016 | Ryu ..................... | G06F 12/0246 711/103 |
| 2016/0239383 A1 * | 8/2016 | Feng ................... | G06F 12/0246 |
| 2018/0293001 A1 | 10/2018 | Muchherla et al. | |
| 2020/0133843 A1 * | 4/2020 | Muchherla .......... | G06F 12/0897 |

* cited by examiner

*Primary Examiner* — Larry T Mackall
(74) *Attorney, Agent, or Firm* — Oblon, McClelland, Maier & Neustadt, L.L.P.

(57) ABSTRACT

According to one embodiment, a memory system includes a non-volatile memory including first and second block groups, and a controller that performs a first write operation for the first block group and the first or a second write operation for the second block group. A first or second number of bits is written into a memory cell in the first or the second write operation. The second number of bits is larger than the first number of bits. The controller allocates a block to a buffer as a write destination block in the first write operation based on a degree of wear-out of at least one block, and writes data from an external device into the buffer in the first write operation.

21 Claims, 17 Drawing Sheets

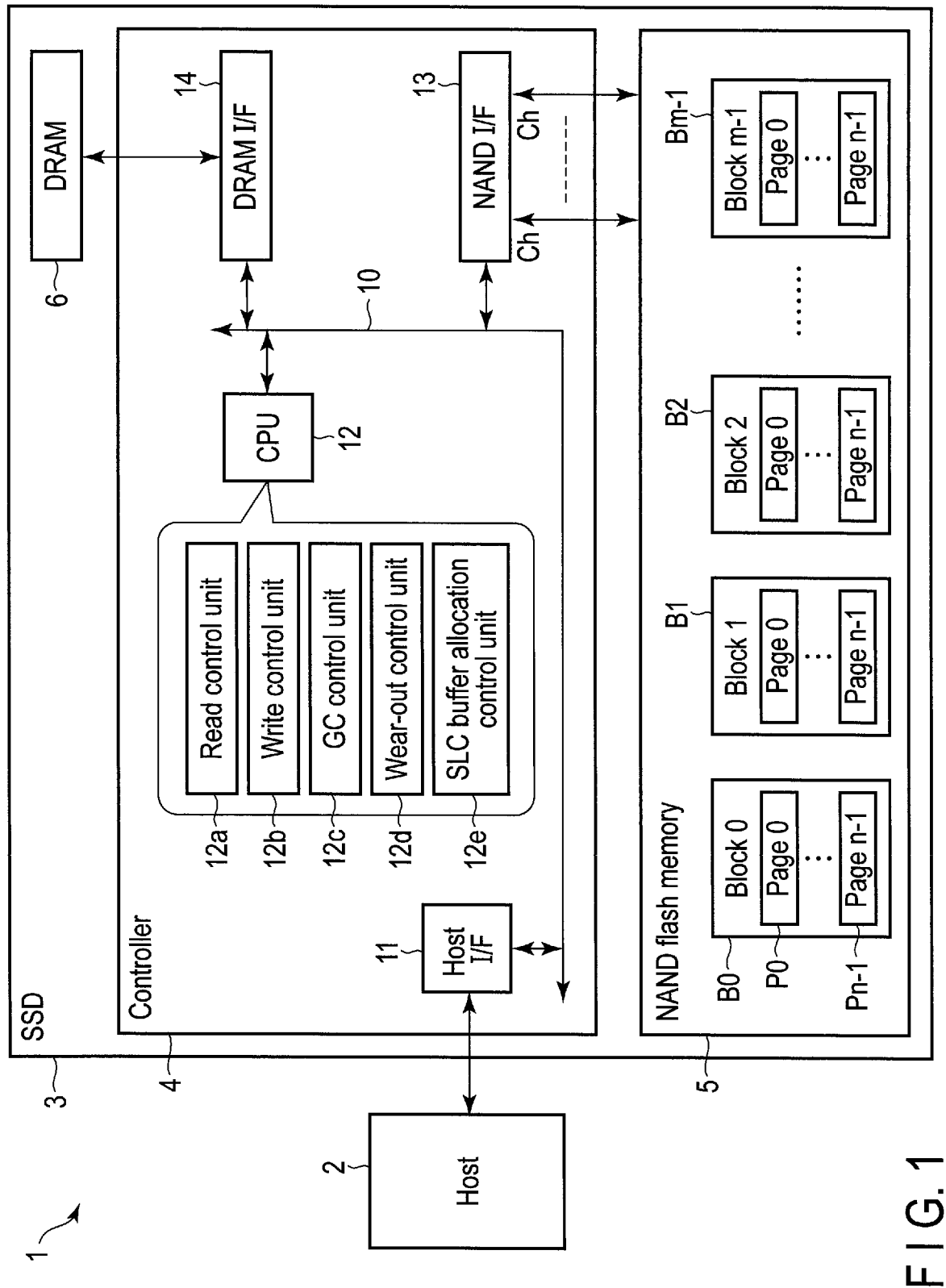
F I G. 1

| Block ID | The number of W/E cycles |
|---|---|
| 1 | *** |
| 2 | **** |
| ⋮ | ⋮ |

F I G. 4

| Block ID | The number of valid clusters |
|---|---|
| 1 | **** |
| 2 | **** |
| ⋮ | ⋮ |

F I G. 5

| TBW (TB) | The allowable number of W/E cycles | |
|---|---|---|
| | SLC-dedicated block group | SLC/TLC-shared block group |
| ⋮ | ⋮ | ⋮ |
| 30 | 2000 | 600 |
| ⋮ | ⋮ | ⋮ |
| 60 | 3150 | 1400 |
| ⋮ | ⋮ | |
| 150 | 30000 | 3000 |

F I G. 6

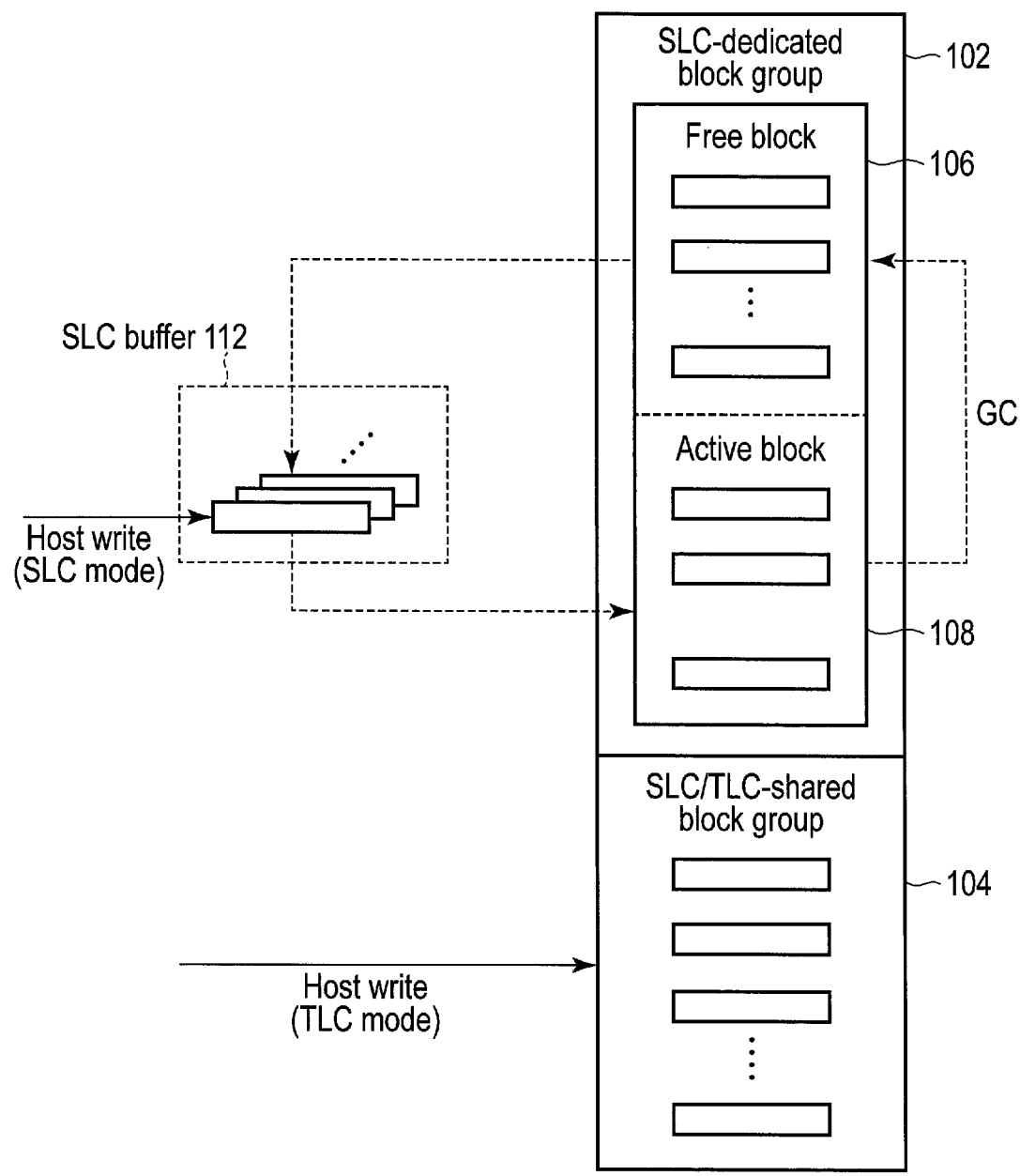
F I G. 7

| Block type | | Use | Without SLC buffer<br>SLC-dedicated block: 0%<br>Shared block: 0%<br>TLC OP: 6% | SLC/TLC-shared block method<br>SLC-dedicated block: 0%<br>Shared block: 2%<br>TLC OP: 4% | SLC-dedicated block method<br>SLC-dedicated block: 2%<br>Shared block: 0%<br>TLC OP: 4% | Hybrid method<br>SLC-dedicated block: 3%<br>(1% of which is used)<br>Shared block: 1%<br>TLC OP: 2% |
|---|---|---|---|---|---|---|
| WAF | SLC-dedicated block | SLC buffer | N/A | N/A | 1 | 0.5 |
| | SLC/TLC-shared block | SLC buffer | N/A | 3 | N/A | 1.5 |
| | | TLC host write destination | 1.0 | 0.9 | 0.9 | 0.9 |
| | | TLC GC write destination | 2.0 | 2.2 | 2.2 | 2.5 |
| | | TLC Total | 3.0 | 6.1 | 3.1 | 4.9 |
| Required number of W/E cycles | SLC-dedicated block | N/A | N/A | N/A | 87891 | 29297 |
| | SLC/TLC-shared block | | 1758 | 3574 | 1816 | 2871 |

FIG. 10

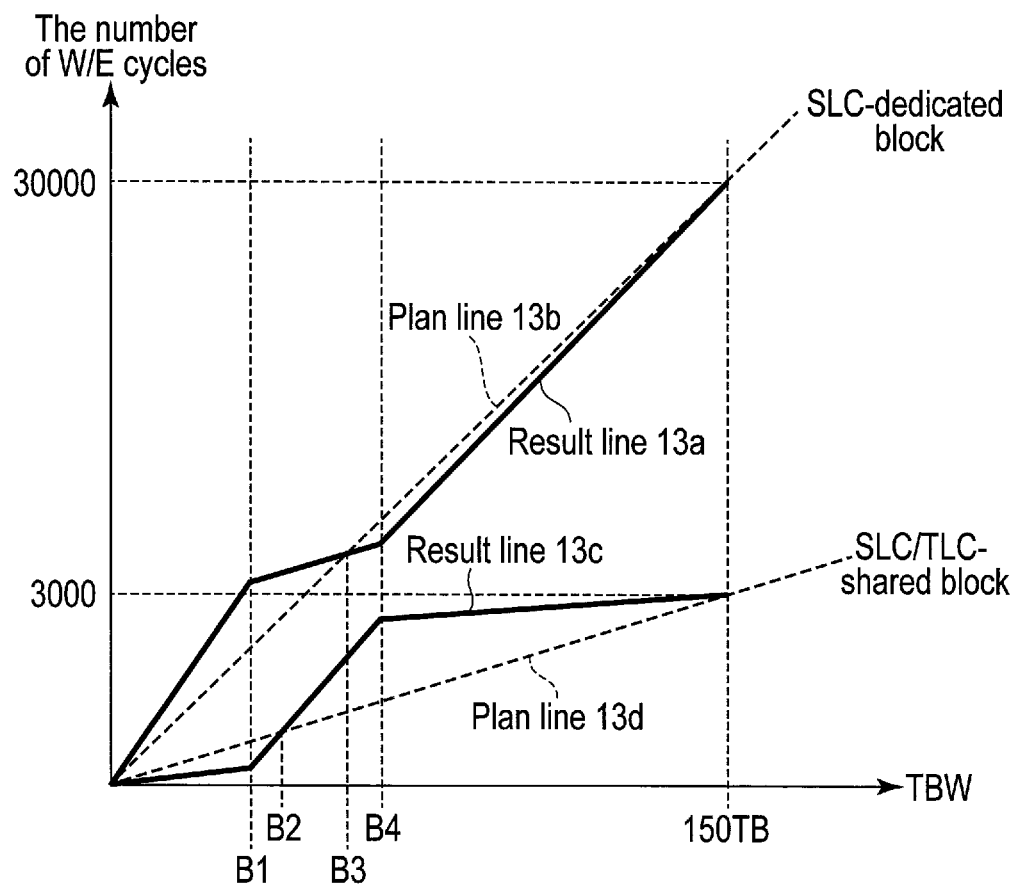
F I G. 13

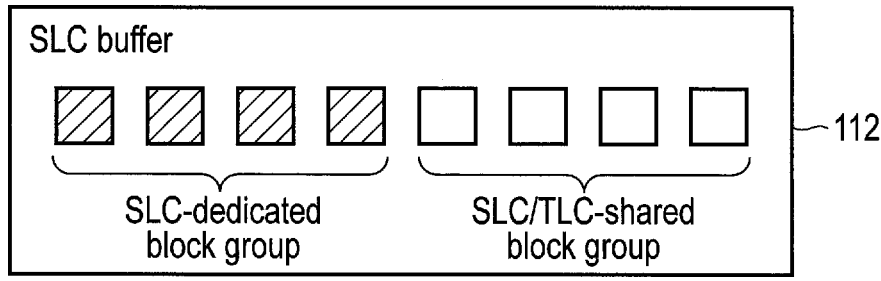
F I G. 15A
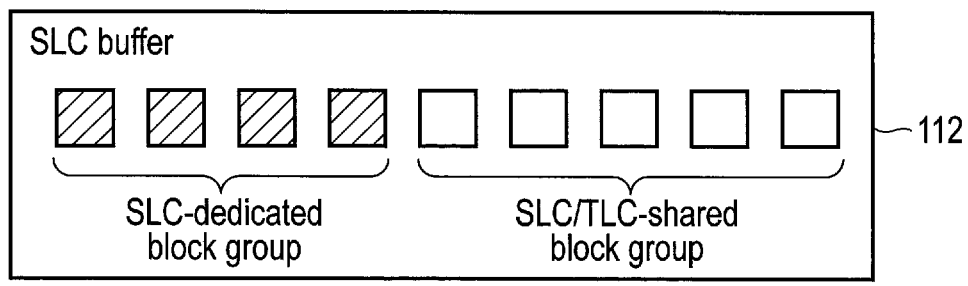
F I G. 15B
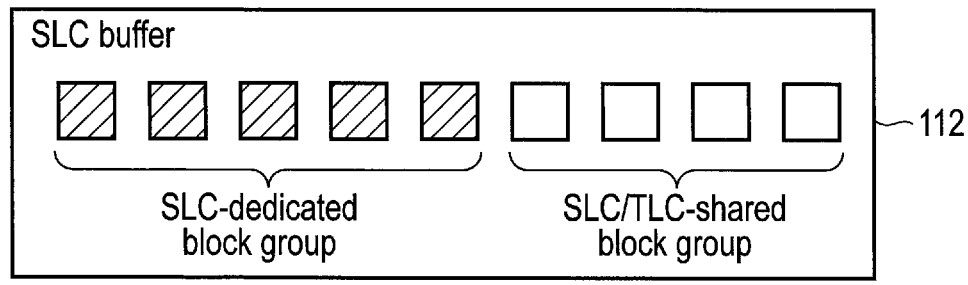
F I G. 15C

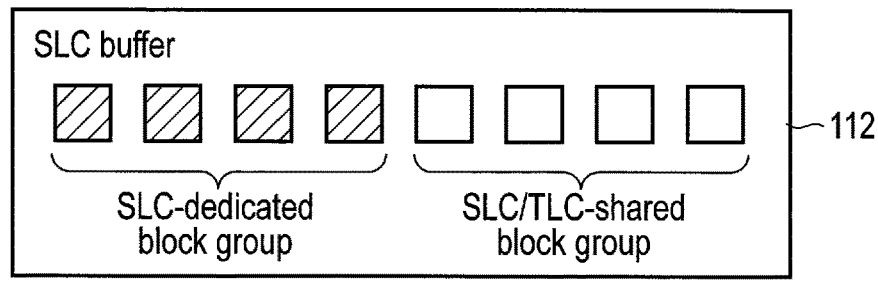
F I G. 17A
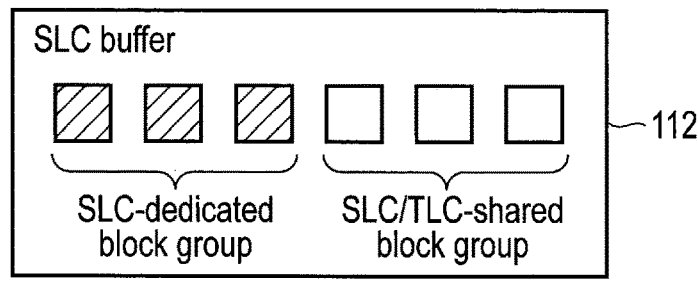
F I G. 17B
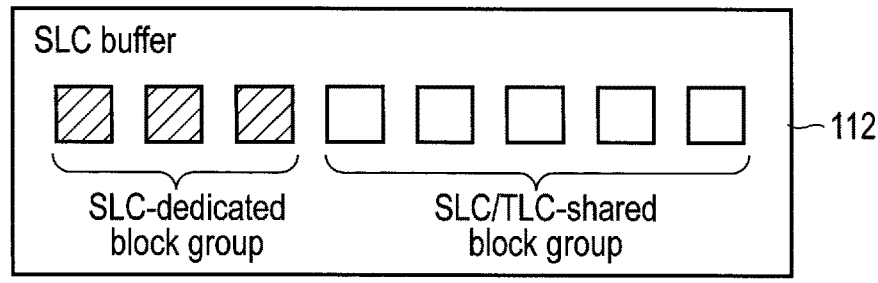
F I G. 17C
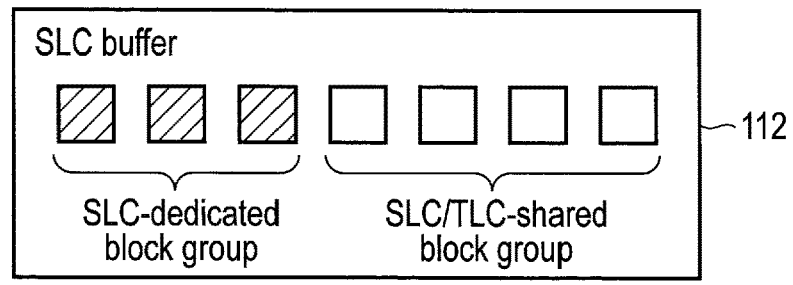
F I G. 17D

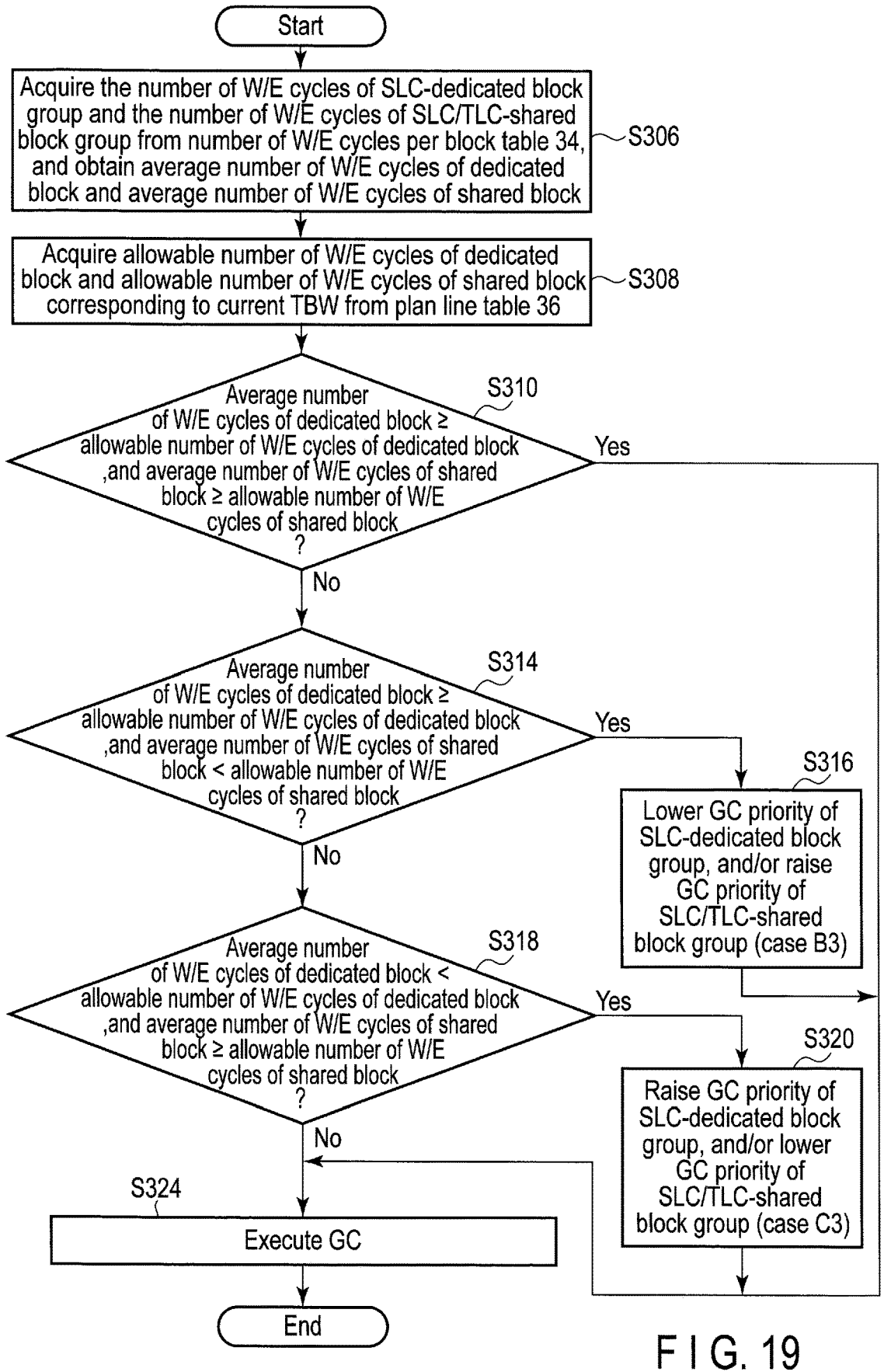
F I G. 19

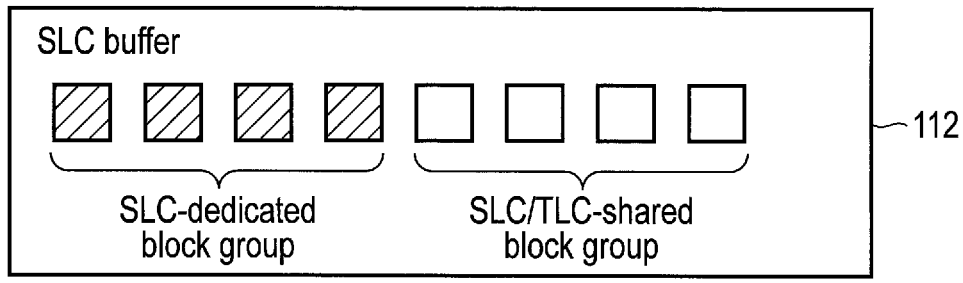
F I G. 21A
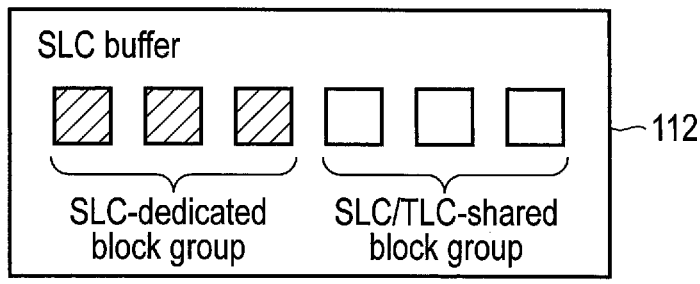
F I G. 21B
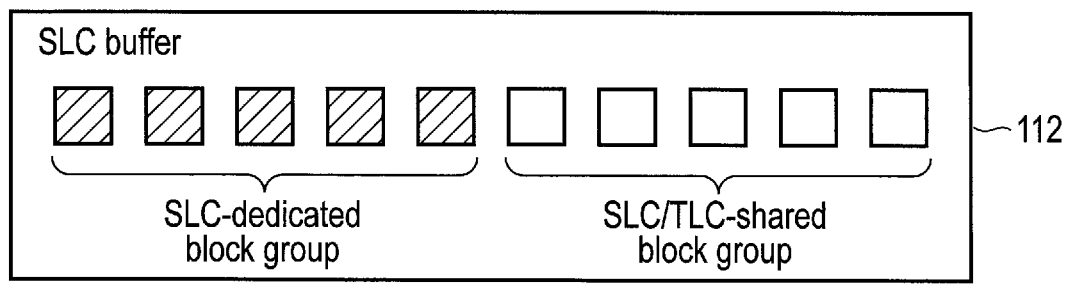
F I G. 21C

MEMORY SYSTEM INCLUDING NON-VOLATILE BUFFER AND CONTROL METHOD THEREOF

CROSS-REFERENCE TO RELATED APPLICATIONS

This application is based upon and claims the benefit of priority from Japanese Patent Application No. 2019-164847, filed Sep. 10, 2019, the entire contents of which are incorporated herein by reference.

FIELD

Embodiments described herein relate generally to a memory system including a non-volatile memory, and a method.

BACKGROUND

Memory systems including a non-volatile memory are widely used.

As an example of such memory systems, a solid-state drive (SSD) including a NAND flash memory is known. SSDs are used as a main storage of various information processing devices.

In a non-volatile memory such as a NAND flash memory, the maximum value of the number of write/erase cycles allowable to be executed on the non-volatile memory is limited, and in a case where the number of W/E cycles executed on the non-volatile memory reaches the maximum value, the operation of the non-volatile memory cannot be guaranteed. Hereinafter, the number of write/erase cycles allowable to be executed may be referred to as "the allowable number of write/erase cycles", and the number of write/erase cycles executed may be referred to as "the execution number of write/erase cycles". In addition, write/erase cycles (W/E cycles) may be referred to as "program/erase cycles (P/E cycles)".

In the non-volatile memory, as the number of bits stored in a memory cell increases, the storage density increases and the memory capacity increases. However, as the number of bits stored in a memory cell increases, the time required to write data to the non-volatile memory and the time required to read data from the non-volatile memory become longer. Recently, in a memory system including a non-volatile semiconductor memory capable of storing a plurality of bits of data per memory cell, it has been considered to write data into the non-volatile memory by selectively using a single-level cell (SLC) write operation in which 1 bit is written into a memory cell and another write operation in which a plurality of bits are written into a memory cell.

In a memory system in which data is written to a non-volatile memory by selectively using the two write operations, if the throughput increases, it is impossible to increase the total amount of data that can be written to the non-volatile memory before the execution number of W/E cycles reaches the maximum value of the allowable number of W/E cycles.

BRIEF DESCRIPTION OF THE DRAWINGS

FIG. 1 is an exemplary block diagram illustrating a memory system according to a first embodiment.

FIG. 4 is an exemplary view illustrating a number of W/E cycles per block table used in the memory system according to the first embodiment.

FIG. 5 is an exemplary view illustrating a number of valid clusters per block table used in the memory system according to the first embodiment.

FIG. 6 is an exemplary view illustrating a plan line table used in the memory system according to the first embodiment.

FIG. 7 is an exemplary view illustrating a concept of data writing in an SLC-dedicated block method.

FIG. 10 is an exemplary view illustrating a write amplification factor (WAF) and the number of W/E cycles in the SLC-dedicated block method, the SLC/TLC-shared block method, and the hybrid method.

FIG. 13 is an exemplary view illustrating a relationship between the total amount of data from the host written into an SSD in the hybrid method and the number of W/E cycles.

FIGS. 15A, 15B, and 15C are exemplary views illustrating a concept of a change in a configuration of the SLC buffer in the second embodiment.

FIGS. 17A, 17B, 17C, and 17D are exemplary views illustrating a concept of a change in a configuration of the SLC buffer in the third embodiment.

FIG. 19 is an exemplary flowchart illustrating a process of a fourth embodiment for adjusting garbage collection priorities of SLC-dedicated blocks and SLC/TLC-shared blocks.

FIGS. 21A, 21B, and 21C are exemplary views illustrating a concept of a change in a configuration of the SLC buffer in the fifth embodiment.

DETAILED DESCRIPTION

Figure 2:
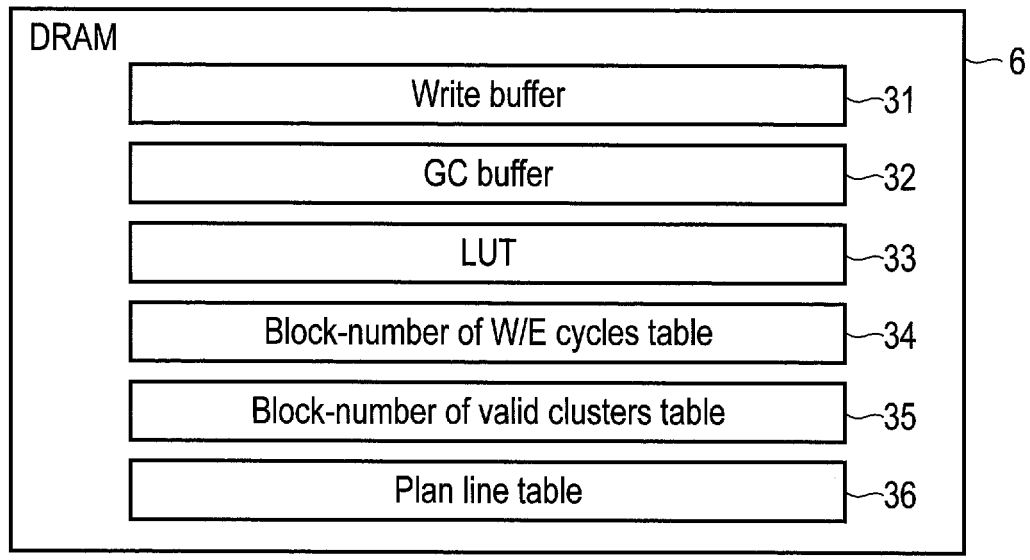
FIG. 2 is an exemplary block diagram showing a configuration in a volatile random access memory in the memory system according to the first embodiment.

Embodiments will be described below with reference to the drawings. The following description exemplifies a device and a method for embodying the technical idea of the embodiments, and the technical idea of the embodiments is not limited to the structure, shape, arrangement, material, and the like of the components described below. Variations that can be easily conceived by a person skilled in the art are naturally included in the scope of the disclosure. For the purpose of a clearer description, the size, thickness, planar dimensions, shape, or the like of each element may be schematically expressed in the drawings by modifying it with respect to the actual embodiments. A plurality of the drawings may contain elements having dimensional relationships or ratios different from one another. In a plurality of the drawings, redundant descriptions may be omitted by giving same reference numerals to corresponding elements. Some elements may be given a plurality of names. Examples of such names are merely illustrative and do not negate giving other names to those elements. It is not to be negated that an element that is been given a plurality of names is to be given another name. In the following description, "connection" means not only direct connection but also connection via another element.

In general, according to one embodiment, a memory system includes a non-volatile memory including blocks, the blocks including at least one first block in a first block group and at least one second block in a second block group; and a controller that performs a first write operation for the at least one first block and does not perform a second write operation for the at least one first block and that performs the first write operation or the second write operation for the at least one second block. The first number of bits is written into a memory cell in the first write operation. The second number of bits is written into a memory cell in the second write operation. The second number is larger than the first number. The controller allocates one or some of the blocks to a buffer as a write destination block in the first write operation based on a degree of wear-out of at least one of the blocks, and writes data from an external device into the buffer in the first write operation.

First Embodiment

FIG. 1 shows an example of an information processing system 1 including a memory system according to an embodiment. The memory system is a semiconductor storage device configured to write data to a non-volatile memory and read data from the non-volatile memory. An example of the non-volatile memory includes a NAND flash memory, a NOR flash memory, a Magneto resistive Random Access Memory (MRAM), a Phase change Random Access Memory (PRAM), a Resistive Random Access Memory (ReRAM), and a Ferroelectric Random Access Memory (FeRAM). In this specification, the example of the non-volatile memory is a NAND flash memory.

The information processing system 1 includes a host (also referred to as a host device) 2 and an SSD 3. The host 2 is an information processing device that accesses the SSD 3 as an external device. The host 2 may be a server (storage server) that stores a large amount of various data to the SSD 3, or the host 2 may be a personal computer.

The SSD 3 can be used as the main storage of the information processing device functioning as the host 2. The SSD 3 may be built in the information processing device, or may be provided outside the information processing device and connected to the information processing device via a cable or a network.

As an interface for interconnecting the host 2 and the SSD 3, Small Computer System Interface (SCSI), Serial Attached SCSI (SAS), Advanced Technology Attachment (ATA), Serial ATA (SATA), PCI Express (PCIe) (registered trade mark), Ethernet (registered trade mark), Fibre channel, NVM Express (NVMe) (registered trade mark), or the like may be used.

The SSD 3 includes a NAND flash memory 5 and a controller 4 therefor. The controller 4 can be implemented by a circuit such as a system-on-a-chip (SoC). The SSD 3 may include a random access memory that is a volatile memory, for example, a DRAM 6. Alternatively, instead of the DRAM 6, an SRAM may be built in the controller 4.

The NAND flash memory 5 may include a plurality of NAND flash memory chips (also referred to as NAND flash memory dies). Each NAND flash memory chip is implemented as a NAND flash memory configured to be capable of storing a plurality of bits per memory cell.

The NAND flash memory 5 includes a memory cell array including a plurality of memory cells arranged in a matrix. The NAND flash memory 5 may be a NAND flash memory having a two-dimensional structure or may be a NAND flash memory having a three-dimensional structure.

The memory cell array of the NAND flash memory 5 includes a plurality of blocks $B_0$ to $B_{m-1}$. Each of the blocks $B_0$ to $B_{m-1}$ includes a plurality of pages (here, pages $P_0$ to $P_{n-1}$). A block is the smallest addressable unit for erasing. A block may also be referred to as an erase block or a physical block. Each of the pages $P_0$ to $P_{n-1}$ includes a plurality of memory cells connected to the same word line. A page is the smallest addressable unit for writing and reading. Instead of a page, a word line may be the smallest addressable unit for writing and reading.

The maximum value of the allowable number of W/E cycles for each of the blocks $B_0$ to $B_{m-1}$ is limited. One W/E cycle for a block includes an erase operation for making all memory cells in the block be an erased state and a write operation for writing data to each page of the block (also referred to as a program operation).

The NAND flash memory 5 may be configured to be capable of storing 1 bit per memory cell, or may be configured to be capable of storing a plurality of bits per memory cell. The NAND flash memory 5 configured to be capable of storing a plurality of bits per memory cell includes a multi-level cell (MLC or 4LC) flash memory capable of storing 2 bits per memory cell, a triple-level cell (TLC or 8LC) flash memory capable of storing 3 bits per memory cell, and a quad-level cell (QLC or 16LC) flash memory capable of storing 4 bits per memory cell. The NAND flash memory 5 may be configured to be capable of storing 5 bits or more per memory cell.

The write operation for writing data to the NAND flash memory 5 includes a first write operation and a second write operation, in which the number of bits written per memory cell is different. The number of bits written per memory cell in the first write operation is smaller than the number of bits written per memory cell in the second write operation. The write operation for writing 1 bit per memory cell is referred to as an SLC write operation; the write operation for writing 2 bits per memory cell is referred to as an MLC write operation; the write operation for writing 3 bits per memory cell is referred to as a TLC write operation; and the write operation for writing 4 bits per memory cell is referred to as a QLC write operation. The write operation for writing a plurality of bits per memory cell may include a write operation for writing 5 bits or more per memory cell. In a case where the first write operation is the SLC write operation, the second write operation is the MLC write operation, the TLC write operation, or the QLC write operation. In a case where the first write operation is the MLC write operation, the second write operation is the TLC write operation or the QLC write operation.

The number of bits of data per memory cell (hereinafter also referred to as data density) is two in the SLC write operation, four in the MLC write operation, eight in the TLC write operation, or sixteen in the QLC write operation. The amount of data stored in the memory cells connected to the same word line is one page in the SLC write operation, two pages in the MLC write operation, three pages in the TLC write operation, and four pages in the QLC write operation. The data read speed and the data write speed for the NAND flash memory 5 become slower as the data density becomes higher, and faster as the data density becomes lower. Accordingly, among these four write operations, the QLC write operation is the slowest in reading and writing data, the SLC write operation is the fastest in reading and writing data, and the SLC write operation is a performance-priority write operation that can achieve high throughput. The write operation in which the data density per memory cell is high is a capacity-priority write operation.

Assuming that the NAND flash memory 5 configured as an SLC flash memory capable of storing 1 bit per memory cell has a storage capacity of 128 GB, and assuming that the number of blocks is the same under an optimal condition (e.g., no defective blocks and the like), the NAND flash memory 5 configured as an MLC flash memory capable of storing 2 bits per memory cell has a storage capacity of 256 GB, the NAND flash memory 5 configured as a TLC flash memory capable of storing 3 bits per memory cell has a storage capacity of 384 GB, and the NAND flash memory 5 configured as a QLC flash memory capable of storing 4 bits per memory cell has a storage capacity of 512 GB.

In a case where the NAND flash memory 5 is implemented as a flash memory configured to be capable of storing a plurality of bits per memory cell, for example, in a case where it is implemented as an MLC flash memory, assuming that there is no defective cell, two pages of data (lower page data and upper page data) are written into a plurality of memory cells connected to the same word line.

Data can be written into the MLC flash memory in the MLC write operation and data can also be written in a write operation having a lower data density, i.e., the SLC write operation. Therefore, a certain area (for example, one or more blocks) in the MLC flash memory can be used as an area capable of storing only 1 bit per memory cell (referred to as an SLC area). The SLC area may be set in smaller units than the block (for instance, a unit of a word line, or a unit of a set of word lines in a block).

In a case where a write operation into which data is written into the SLC area in the MLC flash memory by the SLC write operation is selected, only one page of data (e.g., lower page data) is written into a plurality of memory cells connected to the same word line. As a result, in each block in the MLC flash memory used as the SLC area, only 1 bit can be written into a memory cell, similarly in each block (SLC block) in the SLC flash memory.

Each block used as the SLC area in the MLC flash memory functions as a pseudo-SLC block. In this specification, the pseudo-SLC block is referred to as an SLC-dedicated block. The remaining blocks in the MLC flash memory are referred to as SLC/MLC-shared blocks because they can be commonly used both as SLC blocks and as MLC blocks. Alternatively, the MLC flash memory may include an MLC-dedicated block that can be used only as an MLC block in addition to the SLC-dedicated block and the SLC/MLC-shared block.

In a case where the NAND flash memory 5 is implemented as a TLC flash memory, assuming that there is no defective cell, three pages of data (lower page data, middle page data, and upper page data) are written into a plurality of memory cells connected to the same word line.

Data can be written into the TLC flash memory in the TLC write operation and also in a write operation having a lower data density, i.e., the SLC write operation or the MLC write operation. Therefore, a certain area (for example, one or more blocks) in the TLC flash memory can be used as the above-described SLC area. The TLC flash memory may include an SLC-dedicated block and an SLC/TLC-shared block, which can be commonly used both as an SLC block and as a TLC block, or may further include a TLC-dedicated block.

In a case where the NAND flash memory 5 is implemented as a QLC flash memory, assuming that there is no defective cell, four pages of data are written into a plurality of memory cells connected to the same word line.

Data can be written into the QLC flash memory in the QLC write operation and also in a write operation having a lower data density, i.e., the SLC write operation, the MLC write operation, or the TLC write operation. Therefore, a certain area (for example, one or more blocks) in the QLC flash memory can be used as the above-described SLC area. The QLC flash memory may include an SLC-dedicated block and an SLC/QLC-shared block, or may further include a QLC-dedicated block.

Even in a case where the NAND flash memory 5 is configured to be capable of storing 5 bits or more per memory cell, a certain area in the NAND flash memory 5 can be used as the above-described SLC area.

The controller 4 functions as a memory controller configured to control the NAND flash memory 5.

The controller 4 is electrically connected to the NAND flash memory 5 via an NAND interface (NAND I/F) 13 conforming to Toggle DDR, Open NAND Flash Interface (ONFI), or the like. The NAND interface 13 functions as an NAND control circuit configured to control the NAND flash memory 5. The NAND interface 13 may be connected to a plurality of chips in the NAND flash memory 5 via a plurality of channels.

The controller 4 may function as a flash translation layer (FTL) configured to execute data management and block management of the NAND flash memory 5. The data management executed by the FTL includes (1) management of mapping information indicating the correspondence between each logical address and each physical address of the NAND flash memory 5, and (2) processing for concealing the read/write operation in a unit of page and the erase operation in a unit of block.

The logical address is an address used by the host 2 to indicate a data location to be read or written in the SSD 3. Examples of the logical address include a logical block address (LBA). The physical address is an address used by the controller 4 to indicate a data location to be read or written in the NAND flash memory 5. A block ID is one of the elements constituting the physical address. Determining, from a logical address, a physical address corresponding to the logical address may be referred to as address conversion, address translation, or address resolution.

The controller 4 manages mapping between each LBA and each physical address by a predetermined management size, using a lookup table (LUT) functioning as a logical address/physical address conversion table. A physical address corresponding to a certain LBA indicates a physical storage location in the NAND flash memory 5 into which data corresponding to the LBA has been written. The LUT may be loaded from the NAND flash memory 5 into the DRAM 6 when the SSD 3 is powered on.

Data can be written to a page only once per W/E cycle. For this reason, the controller 4 writes updated data corresponding to a certain LBA not into the physical storage location where the previous data corresponding to this LBA is stored but into another physical storage location. The controller 4 then updates the LUT to associate this LBA with this another physical storage location, and invalidates the previous data. Hereinafter, data being referred to from the LUT (i.e., latest data associated with a logical address) is called as valid data. Data being not associated with any logical address is called as invalid data. The valid data is data that will be read from the host 2 later. The invalid data is data that will no longer be read from the host 2. The data associated with an LBA is valid data, and the data not associated with any LBA is invalid data.

The block management includes management of defective blocks, wear-leveling, and garbage collection (also referred to as "compaction").

The controller 4 may include a host interface (host I/F) 11, a CPU 12, and a DRAM interface (DRAM I/F) 14. The host interface 11, the CPU 12, the NAND interface 13, and the DRAM interface 14 may be interconnected via a bus 10.

The DRAM interface 14 functions as a DRAM controller configured to control access to the DRAM 6.

The CPU 12 is a processor configured to control the host interface 11, the NAND interface 13, and the DRAM interface 14. The CPU 12 performs various processing by executing a control program (firmware) stored in a ROM (not shown) or the like. In addition to the FTL processing described above, the CPU 12 can execute command processing or the like for processing various commands from the host 2. The operation of the CPU 12 is controlled by the above-described firmware executed by the CPU 12. Some or all of the functions described as being implemented by the CPU 12 executing the firmware may be implemented by dedicated hardware in the controller 4.

The CPU 12 can function as a read control unit 12a, a write control unit 12b, a garbage collection (GC) control unit 12c, a wear-out control unit 12d, an SLC buffer allocation control unit 12e, and the like.

The read control unit 12a controls an operation of reading data from the NAND flash memory 5. The write control unit 12b adaptively controls a write operation for writing data received from the host 2 into the NAND flash memory 5. The data to be written may include data to be written into the NAND flash memory 5 through a garbage collection in addition to the data supplied from the host 2. The write control unit 12b selects, as the write operation, either the first write operation for writing the first number of bit(s) into a memory cell (e.g., the SLC write operation) or the second write operation for writing the second number of bit(s) (the second number being larger than the first number) into a memory cell (e.g., the MLC write operation, the TLC write operation, the QLC write operation, and the like). The garbage collection control unit 12c controls the garbage collection executed for a block of the NAND flash memory 5. The SLC buffer allocation control unit 12e reserves a free block of the NAND flash memory 5 for use as an SLC buffer as a write destination block for data from the host 2. Hereinafter, reserving a free block for use as the SLC buffer is also referred to as allocating a free block to the SLC buffer. The free block is a block that does not store valid data and can be used as a write destination block for new data after performing an erase operation. In the following description, the description of writing data into a free block means performing an erase operation for the free block and writing data into the free block in the erased state. The block storing valid data is called an active block. The wear-out control unit 12d detects a degree of wear-out of the block of the NAND flash memory 5 and controls the write control unit 12b, the garbage collection control unit 12c, and the SLC buffer allocation control unit 12e so that all the blocks are evenly worn out. The wear-out control unit 12d also controls the operation of the GC control unit 12c.

FIG. 2 shows an example of a configuration in a volatile random access memory such as the DRAM 6. The DRAM 6 includes a write buffer 31 and a GC buffer 32 that are buffer areas for temporarily storing data to be written into the NAND flash memory 5, a cache area 33 for the LUT, and storage areas for various tables (e.g., a number of W/E cycles per block table 34, a number of valid clusters per block table 35, and a plan line table 36). The DRAM 6 may be provided outside the controller 4.

Figure 3:
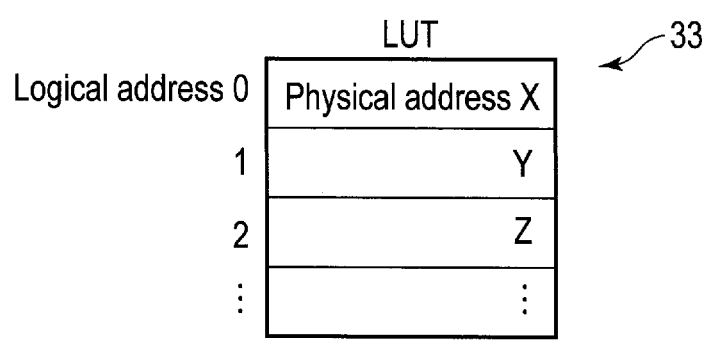
FIG. 3 is an exemplary view illustrating a lookup table (LUT) used in the memory system according to the first embodiment.

As shown in FIG. 3, the LUT cache area 33 manages mapping information between each logical address and each physical address of the NAND flash memory 5.

As shown in FIG. 4, the number of W/E cycles per block table 34 manages the number of W/E cycles for each block included in the NAND flash memory 5.

As shown in FIG. 5, the number of valid clusters per block table 35 manages the number of valid clusters for each block included in the NAND flash memory 5. A cluster is a unit of address conversion. A valid cluster is a cluster that stores valid data. The number of valid clusters (VCC) can be a criterion for determining whether to execute the garbage collection of the block.

As shown in FIG. 6, the plan line table 36 stores the allowable number of W/E cycles for the total amount of data (total byte written: TBW) supplied from the host 2 and to be written into the SSD 3 for each of the SLC-dedicated block and the SLC/TLC-shared block. The allowable number of W/E cycles is the maximum value of the number of W/E cycles allowable per TBW and is determined so that the degree of wear-out of the NAND flash memory 5 does not reach the maximum allowable degree of wear-out before the TBW reaches the target amount. Assuming that the target amount of TBW is 150 TB, the allowable number of W/E cycles is, for example, 30 k cycles for the SLC-dedicated block and 3 k cycles for the SLC/TLC-shared block. Hereinafter, for convenience of description, an example of a flash memory that stores a plurality of bits per memory cell is referred to as a TLC flash memory. However, the embodiments can be similarly applied to other multi-level cell flash memories capable of storing a plurality of bits per memory cell, such as an MLC flash memory and a QLC flash memory.

The operation of host write that is to write data received from the host 2 into the NAND flash memory 5 configured as a TLC flash memory will be described. Since the NAND flash memory 5 may include two types of blocks, such as, the SLC-dedicated block and the SLC/TLC-shared block, host write may be performed in the SLC write operation or the TLC write operation. Note that, in a case where host write is performed in the TLC write operation, throughput decreases. The two types of blocks included in the NAND flash memory 5 are not limited to the SLC-dedicated block and the SLC/TLC-shared block. They may be any two types of blocks into which data can be written by two write operations with the different number of bits per memory cell. For instance, they may be the SLC-dedicated block and the MLC-dedicated block; the SLC-dedicated block and the TLC-dedicated block; the SLC-dedicated block and the QLC-dedicated block; the SLC-dedicated block and the SLC/MLC-shared block; the SLC-dedicated block and the SLC/QLC-shared block; the MLC-dedicated block and the TLC-dedicated block; the MLC-dedicated block and the QLC-dedicated block; the MLC-dedicated block and the MLC/TLC-shared block; the MLC-dedicated block and the MLC/QLC-shared block; the TLC-dedicated block and the QLC-dedicated block; and the TLC-dedicated block and the TLC/QLC-shared block.

Here, a method of writing data from the host 2 into the NAND flash memory 5 in a write operation in which the number of bits to be stored per memory cell is smaller than that in the TLC write operation, i.e., the SLC write operation, is considered. In this write method, data from the host 2 is written into a particular block in the SLC write operation. This particular block is referred to as the SLC buffer. The SLC buffer is not a physical name of a block but a name of a function of the block, and indicates a block into which data supplied from the host 2 is written in the SLC write operation. This write method is classified into an SLC-dedicated block method and an SLC/TLC-shared block method depending on which block to be reserved for use as the SLC buffer, that is, which block to be allocated to the SLC buffer.

FIG. 7 shows the concept of host write of the SLC-dedicated block method. The NAND flash memory 5 includes an SLC-dedicated block group 102 including a plurality of SLC-dedicated blocks and an SLC/TLC-shared block group 104 including a plurality of SLC/TLC-shared blocks. One of free blocks 106 in the SLC-dedicated block group 102 can be allocated to an SLC buffer 112 into which data from the host 2 is written in the SLC write operation. No free block in the SLC/TLC-shared block group 104 is allocated to the SLC buffer 112. Each block shown in FIG. 7 may be the physical block shown in FIG. 1 or may be a logical block in which a plurality of physical blocks are grouped together.

In the NAND flash memory 5, a user capacity is smaller than a physical capacity, the difference between the physical capacity and the user capacity is defined as an overprovisioning (OP) capacity, and the ratio of the overprovisioning capacity to the user capacity is defined as an OP ratio (%). For example, in a case where the physical capacity is 105% of the user capacity, the OP ratio is 5%. The total capacity of the SLC-dedicated block group 102 is set to be equal to or smaller than the OP capacity (for example 3%, which is smaller than 5%). In a case where the total capacity of the SLC-dedicated block group 102 is 3% of the user capacity, the total capacity of the SLC/TLC-shared block group 104 is 102% of the user capacity.

In order to increase the number of free blocks 106 in the SLC-dedicated block group 102 that can be allocated to the SLC buffer 112, the garbage collection is executed for active blocks 108 in the SLC-dedicated block group 102. The garbage collection includes an operation of copying valid data in some of the active blocks 108 where valid data and invalid data are mixedly stored to one of the free blocks 106. The free blocks 106 are included in the SLC-dedicated block group 102 and the SLC/TLC-shared block group 104. The LUT cache area 33 is updated to map each LBA of the copied valid data to the physical address of the copy destination and to invalidate the data of the copy source. One of the active blocks 108 that stores only invalid data by copying valid data to another block is released as a block that does not store valid data. The released one of the active blocks 108 can be reused as one of the free blocks 106.

For convenience of description, the free blocks 106 and the active blocks 108 are shown only for the SLC-dedicated block group 102 that can be allocated to the SLC buffer 112, but the SLC/TLC-shared block group 104 also includes a free block and an active block.

The write control unit 12b writes, in the SLC write operation, data supplied from the host 2 into one of the free blocks 106 in the SLC-dedicated block group 102 allocated to the SLC buffer 112. The one of the free blocks 106 into which data is written may be freely selected from the free blocks 106 allocated to the SLC buffer 112, or may be selected from the free blocks 106 in ascending order of the number of W/E cycles of the block from the viewpoint of wear-out equalization. When the data supplied from the host 2 is stored into the one of the free blocks 106 by storing 1 bit per memory cell, the one of the free blocks 106 becomes one of the active blocks 108.

The data supplied from the host 2 may be directly written into a free block in the SLC/TLC-shared block group 104 in the TLC write operation without being written into the SLC buffer 112. The free block in the SLC/TLC-shared block group 104 into which the data supplied from the host 2 is directly written in the TLC write operation becomes one of the active blocks 108.

The read control unit 12a reads data from one of the active blocks 108 in the SLC-dedicated block group 102 allocated to the SLC buffer 112, and the write control unit 12b writes the read data into a free block in the SLC/TLC-shared block group 104 in the TLC write operation. One of the active blocks 108 in the SLC-dedicated block group 102 allocated to the SLC buffer 112 becomes one of the free blocks 106 when data having been read therefrom is written into a free block in the SLC/TLC-shared block group 104. When one of the active blocks 108 into which data from the host 2 has been written becomes one of the free blocks 106, the state of the one block of being allocated to the SLC buffer 112 ends. A free block in the SLC/TLC-shared block group 104 stores the data having been read from one of the active blocks 108 by storing 3 bits per memory cell.

As a result, in host write of the SLC-dedicated block method, the data supplied from the host 2 is once written, in the SLC write operation, into one of the free blocks 106 in the SLC-dedicated block group 102 allocated to the SLC buffer 112, and the data stored in the SLC buffer 112 is copied, in the TLC write operation, into a free block in the SLC/TLC-shared block group 104. In order to achieve high throughput of host write, it is necessary to increase the total capacity of the SLC-dedicated block group 102 that can be allocated to the SLC buffer 112. However, an increase in the total capacity of the SLC-dedicated block group 102 results in an increase in the cost of the SSD 3.

In order to make it possible to execute host write in the SLC write operation using the SLC buffer 112 even in a state where all the LBAs that the SSD 3 can supply to the host 2 are mapped to physical addresses, it is necessary to execute the garbage collection for the SLC-dedicated block group 102 in order to constantly allocate a certain number of free blocks 106 in the SLC-dedicated block group 102. However, since the total capacity of the SLC-dedicated block group 102 is a few percent, e.g., 3% of the user capacity of the SSD 3 and the total number of blocks of the SLC-dedicated block group 102 is small, the garbage collection is to be frequently executed for the SLC-dedicated block group 102.

For example, if the user capacity is 256 GB and blocks corresponding to 3% of the user capacity are allocated to the SLC-dedicated block group 102, the total capacity of the SLC-dedicated block group 102 is 2.56 GB. That is, since a block originally configured as the SLC/TLC-shared block is used as the SLC-dedicated block having a capacity of ⅓, the total capacity of the SLC-dedicated block group 102 is 256 GB×0.03×(⅓)=2.56 GB. Assuming the TBW target value is 150 TB, the number of W/E cycles required to write 150 TB of data from the host 2 to one of the free blocks 106 in the SLC-dedicated block group 102 allocated to the SLC buffer 112 of 2.56 GB is 150 TB/2.56 GB=58593.75 cycles (approximately 60 k cycles), which is very large. Therefore, it is difficult to achieve the TBW target value of 150 TB. In other words, the SLC-dedicated block method can achieve high throughput, but the lifetime of the entire SSD 3 is short because the lifetime of the SLC-dedicated block group 102 is short.

Figure 8:
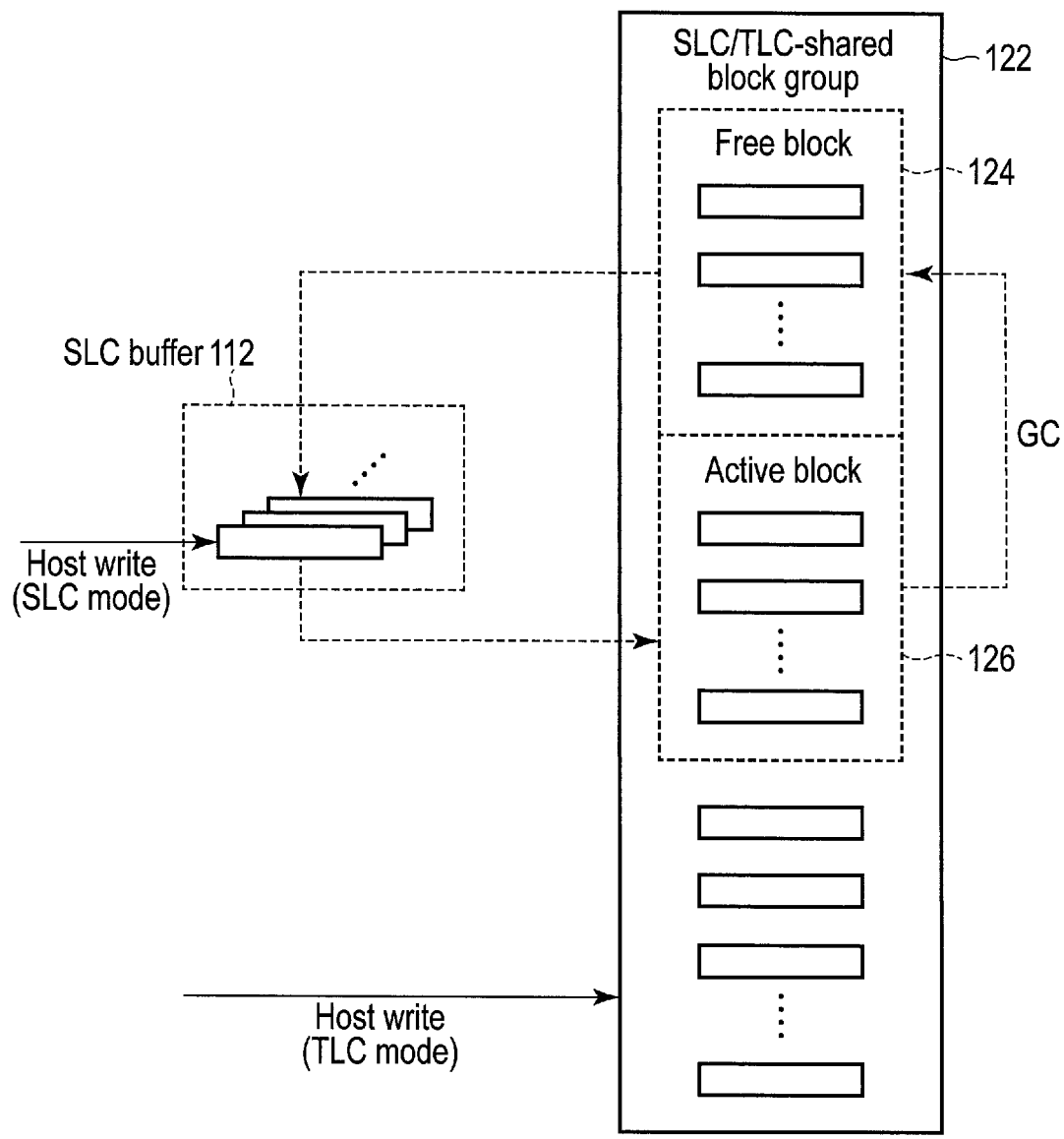
FIG. 8 is an exemplary view illustrating a concept of data writing in an SLC/triple level cell (TLC)-shared block method.

FIG. 8 shows the concept of host write of the SLC/TLC-shared block method. In this method, all the blocks of the NAND flash memory 5 are included in an SLC/TLC-shared block group 122, and the NAND flash memory 5 includes no SLC-dedicated block. Free blocks 124 in the SLC/TLC-shared block group 122 can be allocated to the SLC buffer 112. Each block shown in FIG. 8 may be the physical block shown in FIG. 1 or may also be a logical block in which a plurality of physical blocks are grouped together.

In a case where the OP ratio is 5%, one or some of the free blocks 124 up to a few percent of the user capacity (e.g., 3%) can be allocated to the SLC buffer 112. The free blocks 124 of 3% of the user capacity that can be allocated to the SLC buffer 112 do not need to be fixed in the SLC/TLC-shared block group 122. Any free blocks in the SLC/TLC-shared block group 122 may be allocated to the SLC buffer 112 as long as if they do not exceed 3% of the user capacity in total.

The write control unit 12b writes, in the SLC write operation, data supplied from the host 2 into one of the free blocks 124 in the SLC/TLC-shared block group 122 allocated to the SLC buffer 112. The one of the free blocks 124 into which the data is written may be freely selected from the free blocks 124 allocated to the SLC buffer 112, or may be selected from the free blocks 124 in ascending order of the number of W/E cycles of the block from the viewpoint of wear-out equalization. When the data supplied from the host 2 is stored into the one of the free blocks 124 by storing 1 bit per memory cell, the one of the free blocks 124 becomes one of active blocks 126.

The data supplied from the host 2 may be directly written, in the TLC write operation, into one of the free blocks in the SLC/TLC-shared block group 122 not allocated to the SLC buffer 112 without being written into the SLC buffer 112. The one of the free blocks in the SLC/TLC-shared block group 122 into which the data supplied from the host 2 is directly written in the TLC write operation becomes the active block 126.

The read control unit 12a reads data from one of the active blocks 126 in the SLC/TLC-shared block group 122 allocated to the SLC buffer 112. The write control unit 12b writes, in the TLC write operation, the read data into one of the free blocks in the SLC/TLC-shared block group 122, which is not currently allocated to the SLC buffer 112. The one of the free block stores the data read from the one of the active blocks 126 by storing 3 bits per memory cell.

In order to increase the number of free blocks 124 in the SLC/TLC-shared block group 122 that can be allocated to the SLC buffer 112, the garbage collection control unit 12c executes the garbage collection at an appropriate timing for some of the active blocks 126 in the SLC/TLC-shared block group 122 storing invalid data and allocated to the SLC buffer 112, and generates one or some of the free blocks 124. Through this garbage collection, data is written into the garbage collection destination block in the TLC write operation.

In host write of the SLC/TLC-shared block method, data supplied from the host 2 is written, in the SLC write operation, into one of the free blocks 124 in the SLC/TLC-shared block group 122 allocated to the SLC buffer 112. Therefore, the free blocks 124 in the SLC/TLC-shared block group 122 that can be allocated to the SLC buffer 112 are excessively consumed, and the write amplification factor (WAF) deteriorates. The WAF is an index obtained by dividing an amount of data written to the NAND flash memory 5 by an amount of data received from the host 2.

Describing with a specific example, assuming that the capacity of one block is 18 MiB, and data supplied from the host 2 is written in the TLC write operation into a free block in the SLC/TLC-shared block group 122. If the data of 18 MiB is written from the host 2 into the SSD 3, the number of consumed blocks (or the number of W/E cycles) is one. However, in host write of the SLC/TLC-shared block method, data supplied from the host 2 is written in the SLC write operation into one of the free blocks 124 in the SLC/TLC-shared block group 122 allocated to the SLC buffer 112. The capacity of one of the free blocks 124 in the SLC/TLC-shared block group 122 to which data is written in the SLC write operation is 6 MiB, which is ⅓ of that in a case where data is written into one of the free blocks 124 in the TLC write operation. Therefore, in a case where host write of 18 MiB is performed, the number of consumed blocks (or the number of W/E cycles) is three. Due to this, in a case where data from the host 2 is written into the SLC buffer 112, the WAF changes from one to three, and the WAF deteriorates by two.

As a result, in host write of the SLC/TLC-shared block method, the free blocks 124 in the SLC/TLC-shared block group 122 that can be allocated to the SLC buffer 112 excessively consume their storage capacity. In order to resolve this, the data written into the SLC buffer 112 in the SLC write operation is immediately read. The read data is written in the TLC write operation into a free block in the SLC/TLC-shared block group 122 that is not currently allocated to the SLC buffer 112, and at this time, the WAF deteriorates by up to one.

Due to this, in host write of the SLC/TLC-shared block method, the WAF deteriorates by about three. As the WAF deteriorates, the number of W/E cycles increases, and the total amount of data written from the host 2 into the SSD 3, i.e., the TBW, decreases before the execution number of W/E cycles reaches the maximum value of the allowable number of W/E cycles. Similarly to the SLC-dedicated block method, for instance, the number of W/E cycles required to write 150 TB of data with the user capacity of 256 GB into the SLC buffer 112 (SLC/TLC-shared block) of 2.56 GB is (150 TB×6)/256 GB≈3515 cycles (about 4 k cycles), where the WAF is about six. The number of W/E cycles of the SLC-dedicated block is the number of W/E cycles only related to host write. The number of W/E cycles of the SLC/TLC-shared block is the sum of the number of W/E cycles related to host write and the number of W/E cycles related to garbage collection write. Here, the WAF is set to about six, in consideration of not only host write to the SLC buffer 112 but also garbage collection write. Therefore, the about 4 k cycles include the number of W/E cycles related to not only the host write but also the garbage collection write. While the about 4 k cycles are smaller than about 60 k cycles in the SLC-dedicated block method, in some cases, it is desired to further limit the maximum value of the allowable number of W/E cycles of the SLC/TLC-shared block of the NAND flash memory 5 to smaller cycles, for example, about 3 k cycles.

Figure 9:
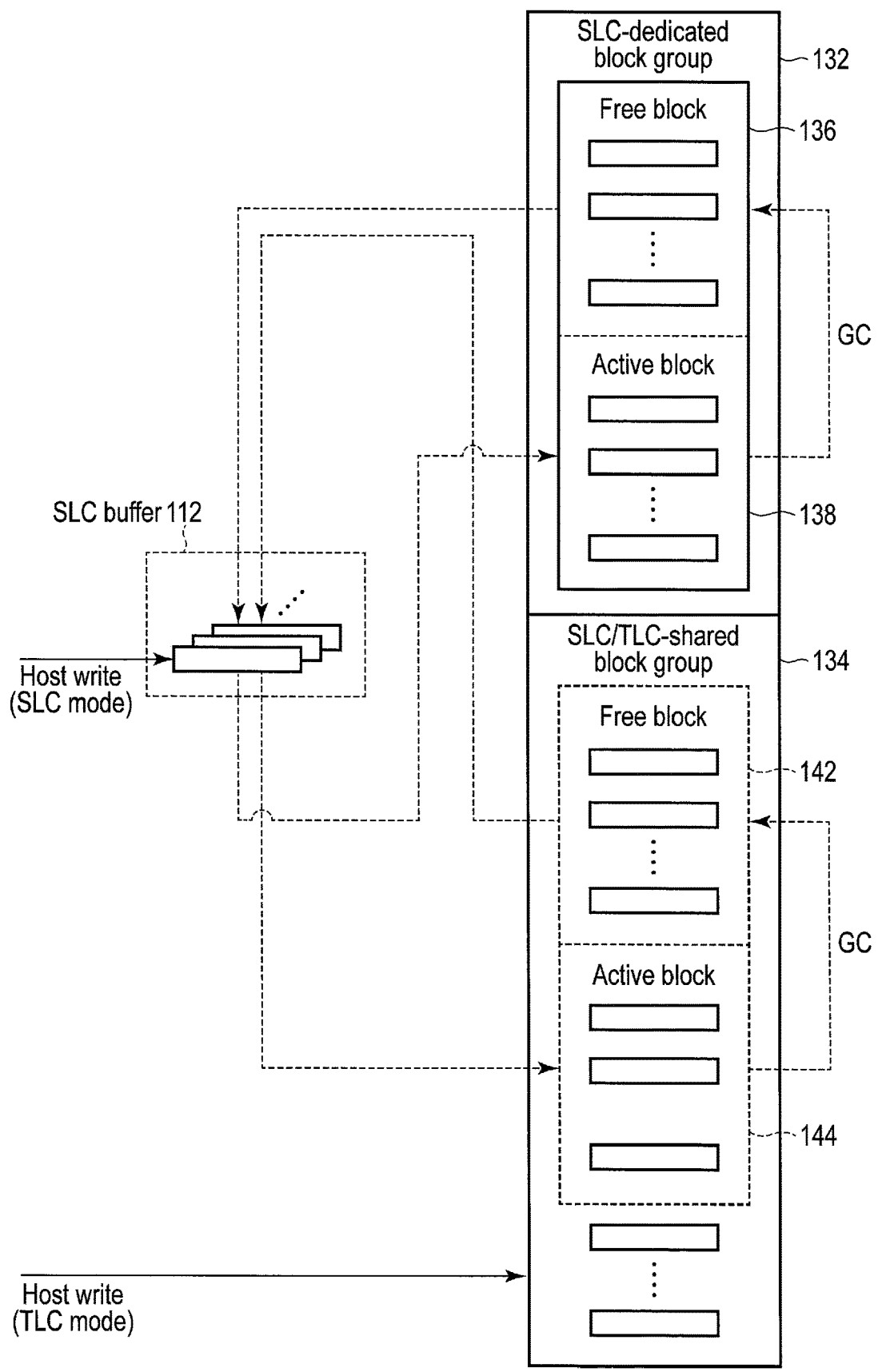
FIG. 9 is an exemplary view illustrating a concept of data writing in a hybrid method.

With reference to FIG. 9, the concept of a host write method of the first embodiment will be described. The host write method of the first embodiment may be said to be a hybrid method having both the function of the SLC-dedicated block method and the function of the SLC/TLC-shared block method. The NAND flash memory 5 includes an SLC-dedicated block group 132 and an SLC/TLC-shared block group 134. In a case where the OP ratio is 5%, for example, the total capacity of the SLC-dedicated block group 132 is 3% of the user capacity, and the total capacity of the SLC/TLC-shared block group 134 is 102% of the user capacity.

Each block shown in FIG. 9 may also be a physical block shown in FIG. 1 or may also be a logical block in which a plurality of physical blocks are grouped together.

One or some of the free blocks 136 in the SLC-dedicated block group 132 can be allocated to the SLC buffer 112. Furthermore, one or more free blocks 142 in the SLC/TLC-shared block group 134 can also be allocated to the SLC buffer 112. The capacity of the free blocks 142 that can be allocated to the SLC buffer 112 is, for example, equal to or smaller than 3% of the user capacity. The free blocks 142 that can be allocated to the SLC buffer 112 do not need to be particular free blocks in the SLC/TLC-shared block group 134, and any one of the free blocks 142 in the SLC/TLC-shared block group 134 may be allocated to the SLC buffer 112.

The write control unit 12b writes, in the SLC write operation, data supplied from the host 2 into one of the free blocks 136 in the SLC-dedicated block group 132 allocated to the SLC buffer 112 or into one of the free blocks 142 in the SLC/TLC-shared block group 134 allocated to the SLC buffer 112. When the data supplied from the host 2 is stored into one of the free blocks by storing 1 bit per memory cell, the one of the free blocks becomes one of the active blocks 138 or 144, respectively.

The data supplied from the host 2 may be directly written, in the TLC write operation, into a free block that is not currently allocated to the SLC buffer 112 in the SLC/TLC-shared block group 134 without being written into the SLC buffer 112. The free block in the SLC/TLC-shared block group 134 into which the data supplied from the host 2 is directly written in the TLC write operation becomes one of the active blocks 144.

The read control unit 12a reads data from the active blocks 138 or 144, and the write control unit 12b writes, in the TLC write operation, the read data into a block in the SLC/TLC-shared block group 134, which is not currently allocated to the SLC buffer 112. The block becomes one of the active blocks 138 or 144 when the data read from the active blocks 138 or 144 is stored by storing 3 bits per memory cell.

In order to increase the number of free blocks 136 in the SLC-dedicated block group 132 that can be allocated to the SLC buffer 112, the garbage collection control unit 12c executes the garbage collection at an appropriate timing for some of the active blocks 138 storing invalid data and allocated to the SLC buffer 112 in the SLC-dedicated block group 132, and generates one or some of the free blocks 136. Through this garbage collection, data is written into the garbage collection destination block in the SLC write operation. In addition, in order to increase the number of free blocks 142 in the SLC/TLC-shared block group 134 that can be allocated to the SLC buffer 112, the garbage collection control unit 12c executes the garbage collection at an appropriate timing for some of the active blocks 144 storing invalid data and allocated to the SLC buffer 112 in the SLC/TLC-shared block group 134, and generates one or some of the free blocks 142. Through this garbage collection, data is written into the garbage collection destination block in the TLC write operation.

In host write of the hybrid method shown in FIG. 9, the wear-out control unit 12d detects a degree of wear-out of the SLC-dedicated block group 132 and a degree of wear-out of the SLC/TLC-shared block group 134. The degree of wear-out may be detected by various criteria, and it is assumed here to be detected based on the total number of W/E cycles having been executed. The allowable number of W/E cycles that can be executed with respect to the total amount of data written into the SSD 3 (the allowable number of W/E cycles is illustrated in FIG. 6) may be determined as a plan line. The degree of wear-out may be expressed by a comparison between the allowable number of W/E cycles defined by this plan line and the number of W/E cycles having been actually executed. A degree of wear-out of the SLC-dedicated block group 132 is a degree of wear-out of at least one of the SLC-dedicated blocks included in the SLC-dedicated block group 132. The at least one of the SLC-dedicated blocks includes an SLC-dedicated block allocated to the SLC buffer 112 and an SLC-dedicated block not allocated to the SLC buffer 112. A degree of wear-out of the SLC/TLC-shared block group 134 is a degree of wear-out of at least one of the SLC/TLC-shared blocks included in the SLC/TLC-shared block group 134. The at least one of the SLC/TLC-shared blocks includes an SLC/TLC-shared block allocated to the SLC buffer 112 and an SLC/TLC-shared block not allocated to the SLC buffer 112. In a case where the degrees of wear-out of a plurality of blocks are obtained, an average value, a maximum value, and the like thereof may be determined as the degree of wear-out of the block.

Based on information on the degree of wear-out from the wear-out control unit 12d, the SLC buffer allocation control unit 12e may allocate one of the free blocks 136 in the SLC-dedicated block group 132 or one of the free blocks 142 in the SLC/TLC-shared block group 134 to the SLC buffer 112. As a result, at least one of the degree of wear-out of the SLC-dedicated block group 132 and the degree of wear-out of the SLC/TLC-shared block group 134 becomes substantially equal to the allowable value.

Based on information from the wear-out control unit 12d, the GC control unit 12c may also control the execution of garbage collection for the SLC-dedicated block group 132 or the SLC/TLC-shared block group 134. As a result, both the degree of wear-out of the SLC-dedicated block group 132 allocated to the SLC buffer 112 and the degree of wear-out of the SLC/TLC-shared block group 134 allocated to the SLC buffer 112 become substantially equal to the allowable value.

Therefore, it is possible to solve the problem that the number of W/E cycles required to achieve the TBW target for the SLC-dedicated block group 132 becomes excessively large, which has been the problem of the SLC-dedicated block method.

Furthermore, data from the host 2 is written selectively into the free blocks 136 allocated to the SLC buffer 112 in the SLC-dedicated block group 132 and the free blocks 142 allocated to the SLC buffer 112 in the SLC/TLC-shared block group 134. The WAF is improved as compared with the SLC/TLC-shared block method. Accordingly, in the host write of the hybrid method according to the first embodiment, it is possible to realize both throughput and the amount of data that can be written.

FIG. 10 shows a table of examples of the WAFs and the required number of W/E cycles in the SLC-dedicated block method, the SLC/TLC-shared block method, and the hybrid method. The required number of W/E cycles is the number of W/E cycles required to achieve the target value of TBW (150 TB if the user capacity is 256 GB, for example). Here, the OP ratio is assumed to be 6%. For comparison, a method not using the SLC buffer (without SLC buffer) will also be described. In the method, the NAND flash memory 5 includes only SLC/TLC-shared blocks (i.e., no SLC-dedicated blocks) and data supplied from the host 2 is written in the TLC write operation not in the SLC buffer but in one of the SLC/TLC-shared blocks. The "SLC-dedicated" and the "SLC/TLC-shared" of each method indicate the OP ratios of the "SLC-dedicated block" and the "SLC/TLC-shared block", respectively. The "TLC OP" indicates the OP ratio of the SLC/TLC-shared block used as the garbage collection destination block.

In the hybrid method, the amount of data to be written (host write amount) into the free blocks 136 in the SLC-dedicated block group 132 allocated to the SLC buffer 112 and the amount of data to be written (host write amount) into the free blocks 142 in the SLC/TLC-shared block group 134 allocated to the SLC buffer 112 are determined according to an allocation ratio. The allocation ratio is a ratio of the number of free blocks 136 in the SLC-dedicated block group 132 allocated to the SLC buffer 112 to the number of free blocks 142 in the SLC/TLC-shared block group 134 allocated to the SLC buffer 112. Since the number of W/E cycles varies depending on this ratio, performance changes according to this ratio. In FIG. 10, the ratio of the amount of data written into the free blocks 136 in the SLC-dedicated block group 132 allocated to the SLC buffer 112 to the amount of data written into the free blocks 142 in the SLC/TLC-shared block group 134 allocated to the SLC buffer 112 is set to 1:1. The reason why this ratio is set to 1:1 will be described later with reference to FIG. 11.

The first row of the table shows the WAF in a case of allocating the SLC-dedicated block to the SLC buffer. In the method not using the SLC buffer and the SLC/TLC-shared block method, the SLC-dedicated block does not exist, and hence their values are not applicable (N/A). Where the WAF of the SLC-dedicated block method is 1, the WAF of the hybrid method is 0.5.

The second row of the table shows the WAF in a case of allocating the SLC/TLC-shared block to the SLC buffer. In the method not using the SLC buffer and the SLC-dedicated block method, their values are not applicable (N/A). The WAF of the SLC/TLC-shared block method is 3, and the WAF of the hybrid method is 1.5.

The third row of the table shows the WAF in a case of writing data from the host 2 into the SLC/TLC-shared block in the TLC write operation. Where the WAF of the method not using the SLC buffer is 1.0, the WAF of each of the SLC/TLC-shared block method, the SLC-dedicated block method, and the hybrid method is 0.9.

The fourth row of the table shows the WAF in a case of using the SLC/TLC-shared block as the block of the garbage collection destination. The WAF of the method not using the SLC buffer is 2.0, the WAF of the SLC/TLC-shared block method is 2.2, the WAF of the SLC-dedicated block method is 2.2, and the WAF of the hybrid method is 2.5.

Therefore, as described in the fifth row of the table, the total WAF related to the SLC/TLC-shared block is 3.0 in the method not using the SLC buffer, 6.1 in the SLC/TLC-shared block method, 3.1 in the SLC-dedicated block method, and 4.9 in the hybrid method.

The execution of W/E cycle is managed so that the allowable number of W/E cycles the required number of W/E cycles. In a case of the method not using the SLC buffer, the number of W/E cycles required to write, in the TLC write operation, 150 TB (TBW) of data from the host 2 into the SLC/TLC-shared block is 1758 cycles; and in a case of the SLC/TLC-shared block method, the number of W/E cycles required to write, in the SLC write operation, 150 TB of data from the host 2 into the SLC/TLC-shared block allocated to the SLC buffer is 3574 cycles. In a case of the SLC-dedicated block method, the number of W/E cycles required to write, in the SLC write operation, 150 TB of data from the host 2 into the SLC-dedicated block allocated to the SLC buffer is 87891 cycles. In a case of the SLC-dedicated block method, 150 TB of data from the host 2 is all written into the SLC-dedicated block, meanwhile data read from the SLC-dedicated block is written into the SLC/TLC-shared block in the TLC write operation. The garbage collection destination block in the garbage collection for the SLC-dedicated block is the SLC/TLC-shared block. The number of W/E cycles required to write into the SLC/TLC-shared block in the TLC write operation is 1816 cycles.

Since the allowable upper limit of the number of W/E cycles of the SLC-dedicated block is about 30 k cycles and the allowable upper limit of the number of W/E cycles of the SLC/TLC-shared block is about 3 k cycles, the number of W/E cycles required to achieve the target value of TBW has exceeded the upper limit of the allowable number of W/E cycles in both of the SLC-dedicated block method and the SLC/TLC-shared block method, and the target value of TBW cannot be achieved.

However, in a case of the hybrid method in which the ratio of the number of SLC-dedicated blocks that have been allocated to the SLC buffer 112 to the number of SLC/TLC-shared blocks that have been allocated to the SLC buffer 112 is 1:1, the number of W/E cycles required to write 150 TB of data from the host 2 into the SLC-dedicated block in the SLC write operation is 29297 cycles, and the number of W/E cycles required to write 150 TB of data from the host 2 into the SLC/TLC-shared block in the SLC write operation is 2871 cycles. Therefore, the number of W/E cycles required to achieve the target value of TBW for both the SLC-dedicated block and the SLC/TLC-shared block does not exceed the upper limit of the allowable number of W/E cycles, and the target value of TBW can be achieved.

Figure 11:
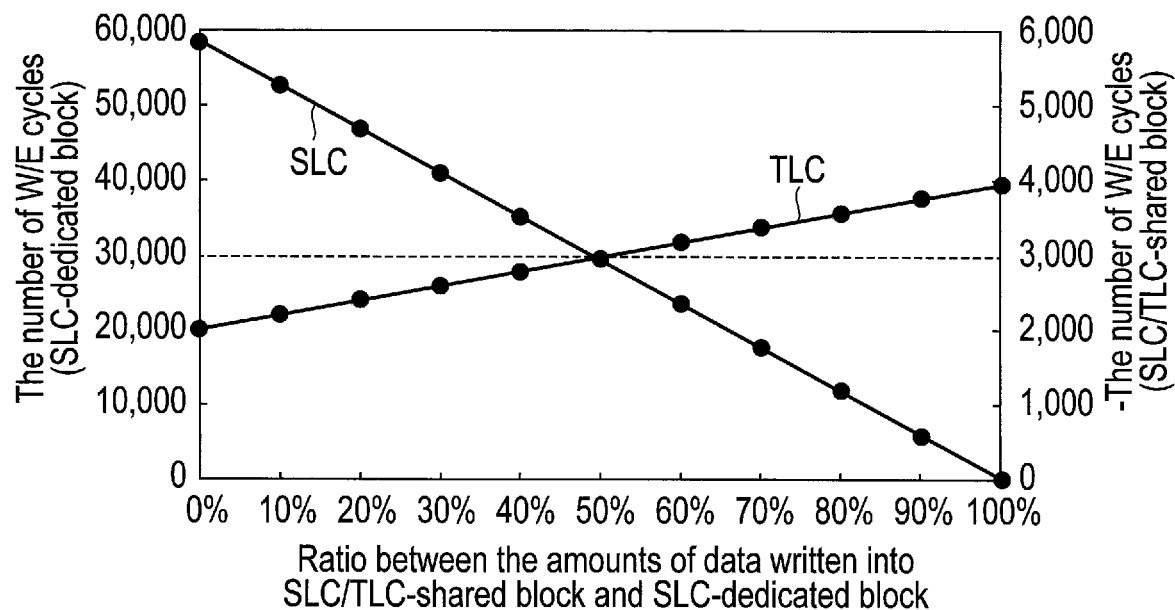
FIG. 11 is an exemplary view illustrating changes in the number of W/E cycles when a ratio of the amount of data from a host written into the SLC/TLC-shared blocks to the amount of data from the host written into the SLC-dedicated blocks, in the hybrid method.

FIG. 11 shows a simulation result of change in the number of W/E cycles required to achieve the target value of TBW. It is assumed that the ratio of the amount of data written into the SLC-dedicated block group 132 which were allocated to the SLC buffer 112 to the amount of data written into the SLC/TLC-shared block group 134 which were allocated to the SLC buffer 112 is changed in the hybrid method, the total capacity of the SLC-dedicated block is 3% of the user capacity, and the total capacity of the SLC/TLC-shared block is 1% of the user capacity. The horizontal axis of FIG. 11 represents the ratio of the amount of data from the host 2 written, in the SLC write operation, into the SLC/TLC-shared block group 134 to the amount of the data from the host 2 written, in the SLC write operation, into the SLC-dedicated block group 132 and the SLC/TLC-shared block group 134. The ratio of 0% indicates that data from the host 2 is written only into the SLC-dedicated block group 132 and the ratio of 100% indicates that data from the host 2 is written only into the SLC/TLC-shared block group 134 in the SLC write operation.

As the ratio changes from 0% to 100%, the number of W/E cycles of the SLC-dedicated block group 132 changes from about 60 k cycles to 0 cycle, and the number of W/E cycles of the SLC/TLC-shared block group 134 changes from about 2 k cycles to about 4 k cycles. The W/E cycle of the SLC/TLC-shared block group 134 is executed when data read from the SLC-dedicated block group 132 is written into the SLC/TLC-shared block group 134 or in a case where the garbage collection for the SLC-dedicated block group 132 is executed.

In order to achieve the target of TBW, it is necessary that the number of W/E cycles of the SLC-dedicated block group 132 does not exceed 30 k cycles and the number of W/E cycles of the SLC/TLC-shared block group 134 does not exceed 3 k cycles. In order to satisfy these conditions, it is necessary that the ratio of the amount of data written into the SLC/TLC-shared block group 134 in the SLC write operation to the amount of data written into the SLC-dedicated block group 132 in the SLC write operation be 50%, that is, data from the host 2 is written into the SLC-dedicated block group 132 and the SLC/TLC-shared block group 134 at the ratio of 1:1. Therefore, the ratio of the number of free blocks in the SLC-dedicated block group 132 allocated to the SLC buffer 112 to the number of free blocks in the SLC/TLC-shared block group 134 allocated to the SLC buffer 112 becomes 1:1.

Figure 12:
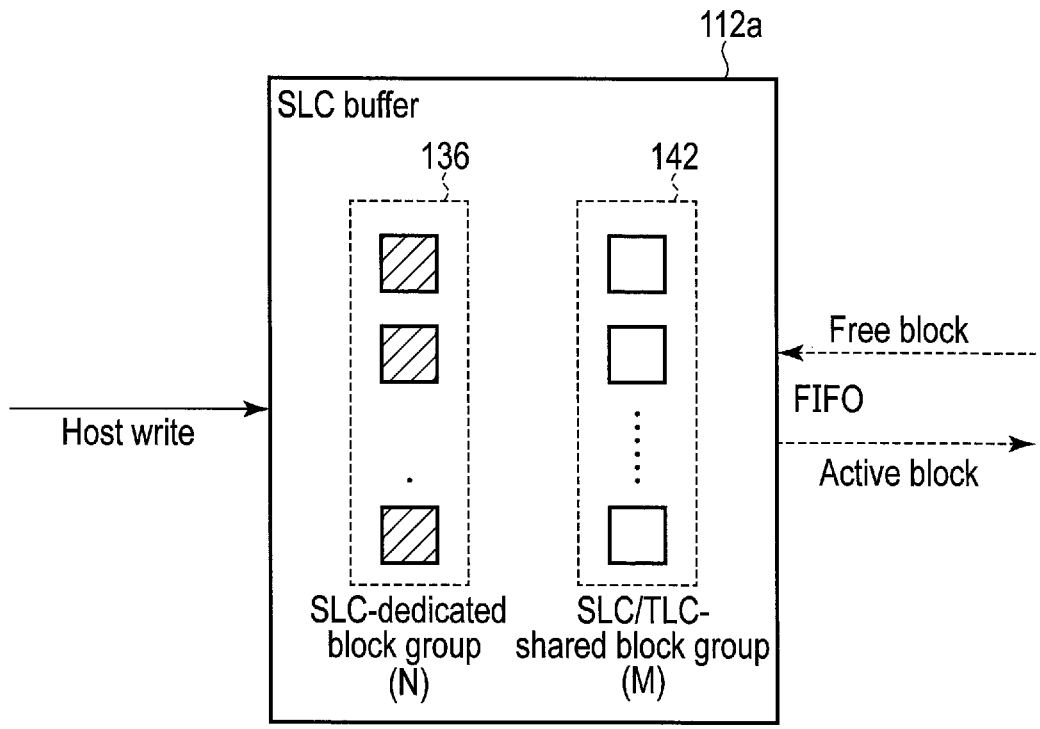
FIG. 12 is an exemplary view illustrating a concept of an SLC buffer in the first embodiment.

FIG. 12 shows the concept of an SLC buffer 112a in the host write method of the first embodiment based on the result shown in FIG. 11. The configuration of the NAND flash memory 5 is the same as that in FIG. 9. In the first embodiment, data supplied from the host 2 is always written into the SLC buffer 112a in the SLC write operation. The data supplied from the host 2 is not written into the SLC/TLC-shared block in the TLC write operation.

In the initial state before the host write is started, as shown in FIG. 12, the SLC buffer allocation control unit 12e allocates N free blocks 136 in the SLC-dedicated block group 132 and M free blocks 142 in the SLC/TLC-shared block group 134 to the SLC buffer 112a. N and M are positive integers. The free blocks 142 are those allocated to the SLC buffer 112a among the free blocks in the SLC/TLC-shared block group 134.

In the SLC buffer 112a, the order in which data is written into the free blocks (the order in which the state of the blocks changes from the free block to the active block) and the order in which the garbage collection for the active blocks is executed (the order in which the state of the blocks changes from the active block to the free block) are determined in a FIFO (First In, First Out) method. That is, data supplied from the host 2 is written into one of the free blocks 136 and the free blocks 142 allocated to the SLC buffer 112a. An active block into which the data is first written is first determined as a block of the garbage collection source. Even if all the data of the active block written first is valid data, the active block written first is determined as the block of the garbage collection source. When a free block is generated through the garbage collection, the SLC buffer allocation control unit 12e allocates the free block to the SLC buffer 112a. The garbage collection is performed for each of the SLC-dedicated block group 132 and the SLC/TLC-shared block group 134. If a block of the garbage collection source is an active block in the SLC-dedicated block group 132, a free block of the SLC-dedicated block group 132 is generated through the garbage collection. If a block of the garbage collection source is an active block in the SLC/TLC-shared block group 134, a free block of the SLC/TLC-shared block group 134 is generated through the garbage collection. Due to this, the sum of the number of free blocks 136 in the SLC-dedicated block group 132 allocated to the SLC buffer 112a, the number of free blocks 142 in the SLC/TLC-shared block group 134 allocated to the SLC buffer 112a, and the number of active blocks into which data is written in the SLC write operation is kept at (N+M).

Assuming that the capacity of the entire SLC buffer 112a is A (GB), the capacity of the free blocks 136 in the SLC-dedicated block group 132 allocated to the SLC buffer 112a is A×N/(N+M) (GB), and the capacity of the free blocks 142 in the SLC/TLC-shared block group 134 allocated to the SLC buffer 112a is A×M/(N+M) (GB).

Specific examples of M and N can be obtained by the simulation as in FIG. 11. That is, M=N in the case of FIG. 11. The specific value of M or N is determined depending on the capacity of the SLC buffer 112a.

If the free blocks 136 in the SLC-dedicated block group 132 and the free blocks 142 in the SLC/TLC-shared block group 134 have been allocated to the SLC buffer 112a at the ratio of 1:1, the data from the host 2 is written into the SLC-dedicated block group 132 and the SLC/TLC-shared block group 134 at the ratio of 1:1. Therefore, the number of W/E cycles of the SLC-dedicated block group 132 and the number of W/E cycles of the SLC/TLC-shared block group 134 until the data of the target TBW is written into the SSD 3 can be prevented from exceeding the respective allowable number of W/E cycles, and host write with high throughput and large TBW is possible.

Second Embodiment

In the first embodiment, the degree of wear-out of at least one of the SLC-dedicated block group 132 and the SLC/TLC-shared block group 134 is adjusted so that the change thereof conforms to the degree of wear-out defined by the plan line in accordance with the allowable number of W/E cycles. For this purpose, the ratio of the number of free blocks in the SLC-dedicated block group 132 allocated to the SLC buffer 112 to the number of free blocks in the SLC/TLC-shared block group 134 allocated to the SLC buffer 112 is initialized so that the ratio of the amount of data from the host 2 written into the SLC-dedicated block group 132 to the amount of data from the host 2 written into the SLC/TLC-shared block group 134 becomes an optimum ratio. This ratio is fixed. In other words, the first embodiment assumes a static control. The ratio is set based on the simulation result in the first embodiment, but the actual operation might be different from the operation assumed by the simulation result. Alternatively, the ratio may be set at any timing without initializing.

Next, a second embodiment in which the allocation ratio of the number of free blocks in the SLC-dedicated block group 132 allocated to the SLC buffer 112 to the number of free blocks in the SLC/TLC-shared block group 134 is dynamically changed will be described. In the second embodiment, the ratio of the amount of data from the host 2 written into the SLC-dedicated block group 132 to the amount of data from the host 2 written into the SLC/TLC-shared block group 134 is changed by adjusting the allocation ratio. As a result, the degree of wear-out of the SLC-dedicated block group 132 and the degree of wear-out of the SLC/TLC-shared block group are adjusted so that the degree of wear-out of the SIC-dedicated block group 132 and the degree of wear-out of the SLC/TLC-shared block group 134 approach the degree of wear-out defined by the plan line in accordance with the allowable number of W/E cycles.

FIG. 13 shows an example of the relationship between the total data amount of host write and the number of W/E cycles in the hybrid method for each of the SLC-dedicated block group 132 and the SLC/TLC-shared block group 134. The number of W/E cycles of the SLC/TLC-shared block group 134 is the sum of the number of W/E cycles in the SLC write operation on the free blocks in the SLC/TLC-shared block group 134 allocated to the SLC buffer 112 and the number of W/E cycles in the TLC write operation on the free blocks in the SLC/TLC-shared block group 134 into which data from the host 2 is directly written. The dashed line indicates the transition in the allowable number of W/E cycles defined by the plan line. The solid line indicates an example of transition in the number of W/E cycles executed in an SSD 3 into which data from the host 2 is written (also referred to as a result line).

In the period where the data amount of host write is from 0 to B1, the number of W/E cycles of the SLC-dedicated block indicated by a result line 13a is equal to or larger than the allowable number of W/E cycles defined by a plan line 13b, meanwhile the number of W/E cycles of the SLC/TLC-shared block indicated by a result line 13c is smaller than the allowable number of W/E cycles defined by a plan line 13d. The NAND flash memory 5 wears out according to the number of W/E cycles having been executed. Therefore, in this period, it can be determined that the degree of wear-out of the SLC-dedicated block is equal to or greater than the maximum allowable degree of wear-out corresponding to the allowable number of W/E cycles, and that the degree of wear-out of the SLC/TLC-shared block is equal to or less than the maximum allowable degree of wear-out.

The allocation ratio of the number of free blocks in the SLC-dedicated block 132 allocated to the SLC buffer 112 to the number of free blocks in the SLC/TLC-shared block group 134 allocated to the SLC buffer 112 in the period where the data amount of host write is from 0 to B1 may be a freely set ratio or the ratio set in the first embodiment, i.e., 1:1.

When the data amount of host write reaches B1, the buffer allocation control unit 12e changes the allocation ratio of the number of free blocks in the SLC-dedicated block group 132 allocated to the SLC buffer 112 to the number of free blocks in the SLC/TLC-shared block group 134 allocated to the SLC buffer 112 based on a control signal from the wear-out control unit 12d. For example, the buffer allocation control unit 12e decreases the allocation ratio of the number of free blocks in the SLC-dedicated block group 132 allocated to the SLC buffer 112 to the number of free blocks in the SLC/TLC-shared block group 134 allocated to the SLC buffer 112. As a result, the ratio of the amount of data written into the SLC-dedicated block group 132 to the amount of data written into the SLC/TLC-shared block group 134 decreases. Alternatively, the buffer allocation control unit 12e increases the allocation ratio of the number of free blocks in the SLC/TLC-shared block group 134 allocated to the SLC buffer 112 to the number of free blocks in the SLC-dedicated block group 132 allocated to the SLC buffer 112. As a result, the ratio of the amount of data written into the SLC/TLC-shared block group 134 to the amount of data written into the SLC-dedicated block group 132 increases. Alternatively, the buffer allocation control unit 12e decreases the allocation ratio of the number of free blocks in the SLC-dedicated block group 132 allocated to the SLC buffer 112 to the number of free blocks in the SLC/TLC-shared block group 134 allocated to the SLC buffer 112. The buffer allocation control unit 12e increases the allocation ratio of the number of free blocks in the SLC/TLC-shared block group 134 allocated to the SLC buffer 112 to the number of free blocks in the SLC-dedicated block group 132 allocated to the SLC buffer 112. As a result, the ratio of the amount of data written into the SLC-dedicated block group 132 to the amount of data written into the SLC/TLC-shared block group 134 decreases. The ratio of the amount of data written into the SLC/TLC-shared block group 134 to the amount of data written into the SLC-dedicated block group 132 increases. By changing these allocation ratios, the SLC/TLC-shared block group 134 will be worn out more than the SLC-dedicated block group 132. Due to this, both the degree of wear-out of the SLC-dedicated block group 132 and that of the SLC/TLC-shared block group 134 approach the maximum allowable degree of wear-out. When the data amount of host write reaches B2, the number of W/E cycles of the SLC/TLC-shared block group 134 indicated by the result line 13c matches the allowable number of W/E cycles defined by the plan line 13d. When the data amount of host write exceeds B2, the number of W/E cycles of the SLC/TLC-shared block group 134 indicated by the result line 13c becomes equal to or larger than the allowable number of W/E cycles defined by the plan line 13d.

Furthermore, when the host write progresses and the data amount of host write reaches B3, the number of W/E cycles of the SLC-dedicated block group 132 indicated by the result line 13a matches the allowable number of W/E cycles defined by the plan line 13b. When the data amount of host write exceeds B3, the number of W/E cycles of the SLC-dedicated block group 132 indicated by the result line 13a becomes equal to or smaller than the allowable number of W/E cycles defined by the plan line 13b.

When the data amount of host write reaches B4, the buffer allocation control unit 12e changes the allocation ratio of the number of free blocks in the SLC-dedicated block group 132 allocated to the SLC buffer 112 to the number of free blocks in the SLC/TLC-shared block group 134 allocated to the SLC buffer 112. For example, the buffer allocation control unit 12e increases the allocation ratio of the number of free blocks in the SLC-dedicated block group 132 allocated to the SLC buffer 112 to the number of free blocks in the SLC/TLC-shared block group 134 allocated to the SLC buffer 112. As a result, the ratio of the amount of data written into the SLC-dedicated block group 132 to the amount of data written into the SLC/TLC-shared block group 134 increases. Alternatively, the buffer allocation control unit 12e decreases the allocation ratio of the number of free blocks in the SLC/TLC-shared block group 134 allocated to the SLC buffer 112 to the number of free blocks in the SLC-dedicated block group 132 allocated to the SLC buffer 112. As a result, the ratio of the amount of data written into the SLC/TLC-shared block group 134 to the amount of data written into the SLC-dedicated block group 132 decreases. Alternatively, the buffer allocation control unit 12e increases the allocation ratio of the number of free blocks in the SLC-dedicated block group 132 allocated to the SLC buffer 112 to the number of free blocks in the SLC/TLC-shared block group 134 allocated to the SLC buffer 112. The buffer allocation control unit 12e decreases the allocation ratio of the number of free blocks in the SLC/TLC-shared block group 134 allocated to the SLC buffer 112 to the number of free blocks in the SLC-dedicated block group 132 allocated to the SLC buffer 112. As a result, the ratio of the amount of data written into the SLC-dedicated block group 132 to the amount of data written into the SLC/TLC-shared block group 134 increases. The ratio of the amount of data written into the SLC/TLC-shared block group 134 to the amount of data written into the SLC-dedicated block group 132 decreases. By changing these allocation ratios, the SLC-dedicated block group 132 will be worn out more than the SLC/TLC-shared block group 134. Due to this, both the degree of wear-out of the SLC-dedicated block group 132 and that of the SLC/TLC-shared block group 134 approach the maximum allowable degree of wear-out. As a result, at the time when the target TBW (=150 TB) is achieved, the number of W/E cycles of the SLC-dedicated block group 132 indicated by the result line 13a matches the allowable number of W/E cycles defined by the plan line 13b. The number of W/E cycles of the SLC/TLC-shared block group 134 indicated by the result line 13c matches the allowable number of W/E cycles defined by the plan line 13d. Due to this, at the time when the target TBW is achieved, both the degree of wear-out of the SLC-dedicated block group 132 and that of the SLC/TLC-shared block group 134 become equal to the maximum allowable degree of wear-out.

Although not illustrated, in a case where the number of W/E cycles of the SLC-dedicated block group 132 indicated by the result line 13a is smaller than the allowable number of W/E cycles defined by the plan line 13b, and the number of W/E cycles of the SLC/TLC-shared block group 134 indicated by the result line 13c is also equal to or smaller than the allowable number of W/E cycles defined by the plan line 13d, it is reasonable to determine that both the degree of wear-out of the SLC-dedicated block group 132 and that of the SLC/TLC-shared block group 134 are equal to or less than the maximum allowable degree of wear-out. Therefore, in this case, the allocation ratio of the number of free blocks in the SLC-dedicated block group 132 allocated to SLC buffer 112 to the number of free blocks in the SLC/TLC-shared block group 134 allocated to the SLC buffer 112 is maintained. Furthermore, the size of the SLC buffer may increase by increasing the number of free blocks in the SLC-dedicated block group 132 allocated to the SLC buffer 112 and the number of free blocks in the SLC/TLC-shared block group 134 allocated to the SLC buffer 112 while maintaining the allocation ratio. Due to this, the throughput of host write can be further improved.

Furthermore, although not illustrated, in a case where the number of W/E cycles of the SLC-dedicated block indicated by the result line 13a is equal to or larger than the allowable number of W/E cycles defined by the plan line 13b, and the number of W/E cycles of the SLC/TLC-shared block indicated by the result line 13c is also equal to or larger than the allowable number of W/E cycles defined by the plan line 13d, it is reasonable to determine that both the degree of wear-out of the SLC-dedicated block and that of the SLC/TLC-shared block are equal to or greater than the maximum allowable degree of wear-out. Therefore, in this case, the size of the SLC buffer may decrease by decreasing the number of SLC-dedicated blocks allocated to the SLC buffer and the number of SLC/TLC-shared blocks allocated to the SLC buffer while maintaining the allocation ratio of the SLC-dedicated block and the SLC/TLC-shared block to the SLC buffer.

Some examples of adjusting the number of free blocks in the SLC-dedicated block group 132 allocated to the SLC buffer 112 to the number of free blocks in the SLC/TLC-shared block group 134 allocated to the SLC buffer 112 will be described. By adjusting these two numbers, the allocation ratio of the number of free blocks in the SLC-dedicated block group 132 allocated to the SLC buffer 112 to the number of free blocks in the SLC/TLC-shared block group 134 allocated to the SLC buffer 112 can be adjusted.

Figure 14:
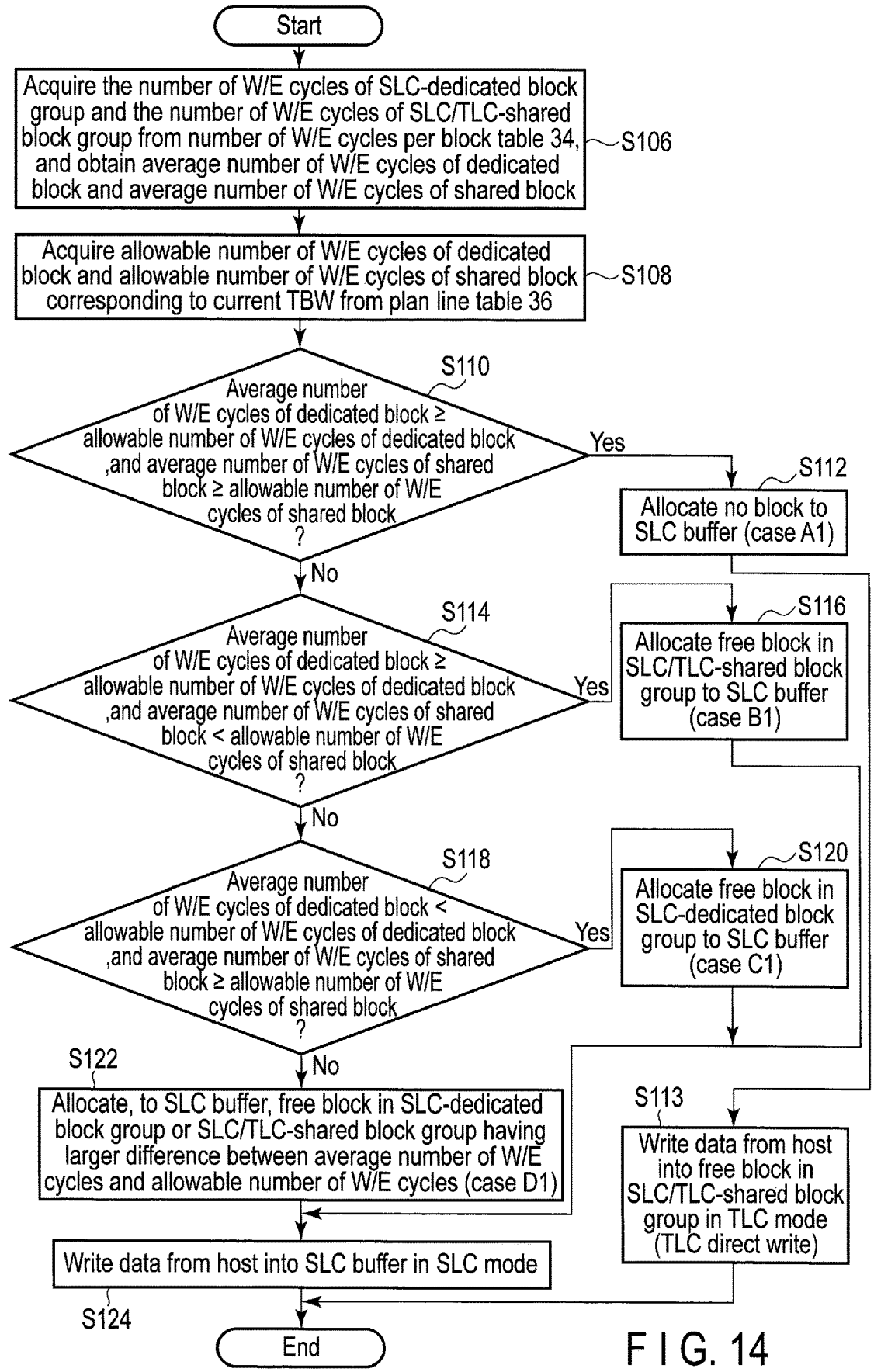
FIG. 14 is an exemplary flowchart illustrating a process of a second embodiment for adjusting an allocation ratio of the number of SLC-dedicated blocks allocated to the SLC buffer to the number of SLC/TLC-shared blocks allocated to the SLC buffer.

With reference to FIGS. 14 and 15A to 15C, an example of adjusting the allocation ratio according to the second embodiment will be described. In the second embodiment, the buffer allocation control unit 12e directly adjusts the allocation ratio. FIG. 14 is a flowchart illustrating an example of the process according to the second embodiment, and FIGS. 15A to 15C shows the concept of a state change of the SLC buffer 112.

The timing at which the processing of the flowchart of FIG. 14 starts is freely selected. It may be a timing at which no more data can be written into the free blocks allocated to the SLC buffer 112 (for example, a timing at which the number of free blocks allocated to the SLC buffer 112 becomes one and data has been written up to the last word line of the one free block).

FIG. 15A shows the allocation state of the SLC-dedicated block group 132 and the SLC/TLC-shared block group 134 allocated to the SLC buffer 112 when the processing of the flowchart of FIG. 14 starts. It is assumed that at this time, blocks in the SLC-dedicated block group 132 and blocks in the SLC/TLC-shared block group 134 are allocated to the SLC buffer 112 at the ratio of 1:1, as in the first embodiment. All the blocks shown in FIG. 15A are active blocks. At the time of starting the processing of the flowchart of FIG. 14, blocks in the SLC-dedicated block group 132 and blocks in the SLC/TLC-shared block group 134 may be allocated to the SLC buffer 112 at a ratio other than 1:1.

In step S106, the wear-out control unit 12d, which recognizes whether the block is in the SLC-dedicated block group 132 or the SLC/TLC-shared block group 134 based on the block ID, acquires the number of W/E cycles of all blocks in the SLC-dedicated block group 132 and in the SLC/TLC-shared block group 134 from the number of W/E cycles per block table 34 shown in FIG. 4, and obtains their average values (hereinafter referred to as the average number of W/E cycles of dedicated block, and the average number of W/E cycles of shared block). The wear-out control unit 12d supplies these values to the SLC buffer allocation control unit 12e. Note that, instead of obtaining the average numbers of W/E cycles of all the blocks in the SLC-dedicated block group 132 and all the blocks in the SLC/TLC-shared block group 134, an average number of W/E cycles of blocks including at least one block may be obtained. Furthermore, instead of the average number, a total number or a maximum number of W/E cycles may be used. The at least one block may be a block in the SLC-dedicated block group 132 allocated to the SLC buffer 112, a block in the SLC/TLC-shared block group 134 allocated to the SLC buffer 112, a block in the SLC-dedicated block group 132 to be allocated to the SLC buffer 112, a block in the SLC/TLC-shared block group 134 to be allocated to the SLC buffer 112, or a block selected independently of its allocation to the SLC buffer 112.

In step S108, the wear-out control unit 12d acquires the allowable number of W/E cycles of the SLC-dedicated block group 132 (hereinafter referred to as an allowable number of W/E cycles of dedicated block) and the allowable number of W/E cycles of the SLC/TLC-shared block group 134 (hereinafter referred to as an allowable number of W/E cycles of shared block) corresponding to the current TBW from the plan line table 36 shown in FIG. 6. The wear-out control unit 12d supplies these values to the SLC buffer allocation control unit 12e.

In step S110, the SLC buffer allocation control unit 12e determines whether the average number of W/E cycles of dedicated block the allowable number of W/E cycles of dedicated block, and the average number of W/E cycles of shared block the allowable number of W/E cycles of shared block.

If the determination result in step S110 is YES, i.e., if the degrees of wear-out of both the SLC-dedicated block group 132 and the SLC/TLC-shared block group 134 are equal to or greater than the maximum allowable degree of wear-out, the SLC buffer allocation control unit 12e does not allocate in step S112 either of a block in the SLC-dedicated block group 132 and a block in the SLC/TLC-shared block group 134 to the SLC buffer 112 (case A1). In this case, since there is no free block that can be used as the SLC buffer 112, data supplied from the host 2 cannot be written into the SLC buffer 112. In step S113, a write control unit 12b writes the data from the host 2 into a free block in the SLC/TLC-shared block group 134 in the TLC write operation, which is not currently allocated to the SLC buffer 112.

If the determination result in step S110 is NO, the SLC buffer allocation control unit 12e determines in step S114 whether the average number of W/E cycles of dedicated block≥the allowable number of W/E cycles of dedicated block, and the average number of W/E cycles of shared block<the allowable number of W/E cycles of shared block.

If the determination result in step S114 is YES, i.e., if the degree of wear-out of the SLC-dedicated block group 132 is equal to or greater than the maximum allowable degree of wear-out, and the degree of wear-out of the SLC/TLC-shared block group 134 is less than the maximum allowable degree of wear-out, the SIC buffer allocation control unit 12e allocates, to the SLC buffer 112, one of the free blocks 142 in the SLC/TLC-shared block group 134, which can be allocated to the SLC buffer 112 in step S116 (case B1). Due to this, as shown in FIG. 15B, the ratio of the number of blocks in the SLC/TLC-shared block group 134 allocated to the SLC buffer 112 to the number of blocks in the SLC-dedicated block group 132 allocated to the SLC buffer 112 increases. As illustrated in FIG. 15B, the blocks in the SLC-dedicated block group 132 are all active blocks, and the blocks in the SLC/TLC-shared block group 134 include four active blocks and one free block. After this, in step S124, the write control unit 12b writes data from the host 2 into the SLC buffer 112 in the SLC write operation. For this reason, thereafter, the SLC/TLC-shared block group 134 will be worn out more than the SLC-dedicated block group 132, and both the degree of wear-out of the SLC-dedicated block group 132 and that of the SLC/TLC-shared block group 134 will approach the maximum allowable degree of wear-out.

If the determination result in step S114 is NO, the SLC buffer allocation control unit 12e determines in step S118 whether the average number of W/E cycles of dedicated block<the allowable number of W/E cycles of dedicated block, and the average number of W/E cycles of shared block≥the allowable number of W/E cycles of shared block.

If the determination result in step S118 is YES, i.e., if the degree of wear-out of the SLC/TLC-shared block group 134 is equal to or greater than the maximum allowable degree of wear-out, and the degree of wear-out of the SLC-dedicated block group 132 is less than the maximum allowable degree of wear-out, the SLC buffer allocation control unit 12e allocates one of the free blocks 136 in the SLC-dedicated block group 132 to the SLC buffer in step S120 (case C1). Due to this, as shown in FIG. 15C, the ratio of the number of blocks in the SLC-dedicated block group 132 allocated to the SLC buffer 112 to the number of blocks in the SLC/TLC-shared block group 134 allocated to the SLC buffer 112 increases. As illustrated in FIG. 15C, the blocks in the SLC-dedicated block group 132 include four active blocks and one free block, and the blocks in the SLC/TLC-shared block are all active blocks. After this, in step S124, the write control unit 12b writes data from the host 2 into the SLC buffer 112 in the SLC write operation. For this reason, thereafter, the SLC-dedicated block group 132 will be worn out more than the SLC/TLC-shared block group 134, and both the degree of wear-out of the SLC-dedicated block group 132 and that of the SLC/TLC-shared block group 134 will approach the maximum allowable degree of wear-out.

If the determination result in step S118 is NO, i.e., if the degrees of wear-out of both the SLC-dedicated block group 132 and the SLC/TLC-shared block group 134 are equal to or less than the maximum allowable degree of wear-out, the SLC buffer allocation control unit 12e allocates in step S122, to the SLC buffer 112, a free block in one of the SLC-dedicated block group 132 and the SLC/TLC-shared block group 134 having a larger difference between the average number of W/E cycles and the allowable number of W/E cycles (case D1). This also increases the size of the SLC buffer 112 as shown in FIG. 15B or 15C, and thus the throughput of host write can be improved. After this, in step S124, the write control unit 12b writes data from the host 2 into a free block allocated to the SLC buffer 112 in the SLC write operation.

Although not illustrated in the flowchart, when data stored in a block allocated to the SLC buffer 112 is written into a block in the SLC/TLC-shared block group 134 in the TLC write operation, the allocation of the block to the SLC buffer 112 ends, and the size of the SLC buffer 112 decreases.

According to the second embodiment, the allocation ratio of the number of blocks in the SLC-dedicated block group 132 allocated to the SLC buffer 112 to the number of blocks in the SLC/TLC-shared block group 134 allocated to the SLC buffer 112 is adjusted depending on whether the actual degree of wear-out of at least one block in the SLC-dedicated block group 132 or the SLC/TLC-shared block group 134 exceeds the maximum allowable degree of wear-out corresponding to the allowable number of W/E cycles defined by the plan line. As a result, it is possible to bring the degrees of wear-out of both the SLC-dedicated block group 132 and the SLC/TLC-shared block group 134 close to the maximum allowable degree of wear-out and it is possible to realize both throughput and the amount of data that can be written.

Third Embodiment

Figure 16:
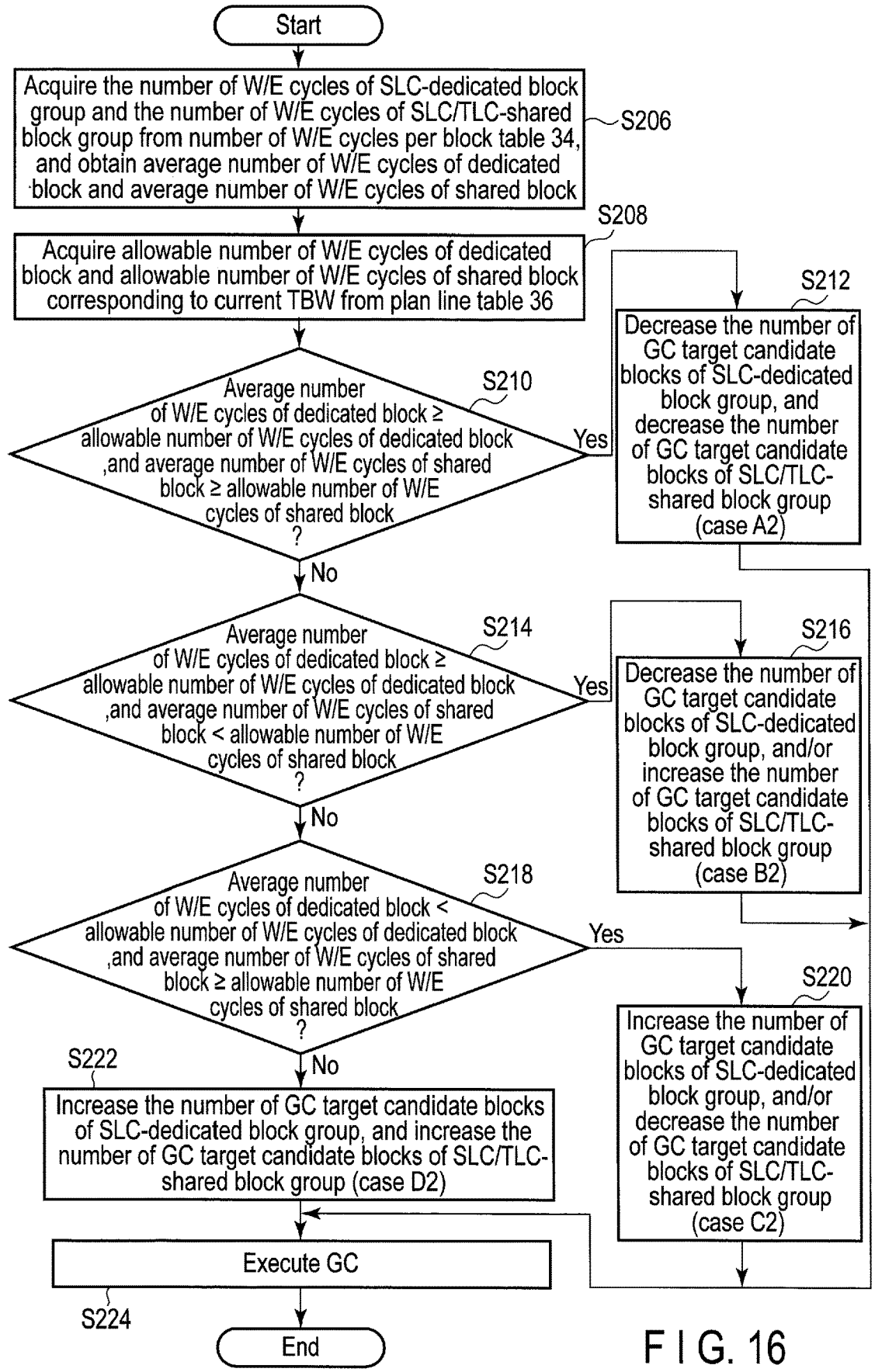
FIG. 16 is an exemplary flowchart illustrating a process of a third embodiment for adjusting the numbers of candidate blocks of garbage collection target in the SLC-dedicated blocks and the SLC/TLC-shared blocks.

With reference to FIGS. 16, 17A to 17D, and 18A to 18C, an example of adjusting the allocation ratio according to a third embodiment will be described. In the third embodiment, the allocation ratio is adjusted by adjusting the number of blocks that are candidates of garbage collection target (hereinafter referred to as GC target candidate blocks) in the SLC-dedicated block group 132 and the number of GC target candidate blocks in the SLC/TLC-shared block group 134. FIG. 16 is a flowchart illustrating an example of the process according to the third embodiment, and FIGS. 17A to 17D and 18A to 18C show the concept of the allocation state change of the SLC buffer 112.

The processing of the flowchart of FIG. 16 is started before execution of garbage collection. For example, when data is written into all of the free blocks allocated to the SLC buffer 112, or when the number of free blocks that can be allocated to the SLC buffer 112 becomes zero or very small, the processing of the flowchart of FIG. 16 starts.

FIG. 17A shows the allocation state of the SLC-dedicated block group 132 and the SLC/TLC-shared block group 134 to the SLC buffer 112 when the processing of the flowchart of FIG. 16 starts. It is assumed that at this time, blocks in the SLC-dedicated block group 132 and blocks in the SLC/TLC-shared block group 134 are allocated to the SLC buffer 112 at the ratio of 1:1, as in the first embodiment. The blocks shown in FIGS. 17A, 17B, 17C, and 17D include active blocks and free blocks both of the SLC-dedicated block group 132 and of the SLC/TLC-shared block group 134. However, at the time of starting the processing of the flowchart of FIG. 16, blocks in the SLC-dedicated block group 132 and blocks in the SLC/TLC-shared block group 134 may be allocated to the SLC buffer 112 at a ratio other than 1:1.

In step S206, as in step S106, the wear-out control unit 12d acquires the number of W/E cycles of all blocks in the SLC-dedicated block group 132 and the number of W/E cycles of all blocks in the SLC/TLC-shared block group 134 from the number of W/E cycles per block table 34. The wear-out control unit 12d obtains the average number of W/E cycles of dedicated block and the average number of W/E cycles of shared block. The wear-out control unit 12d supplies these values to the garbage collection control unit 12c. Instead of obtaining the average numbers of W/E cycles of all the blocks in the SLC-dedicated block group 132 and all the blocks in the SLC/TLC-shared block group 134, an average number of W/E cycles of blocks including the at least one block defined in the second embodiment may be obtained. Furthermore, instead of the average number, a total number or a maximum number thereof may be used.

In step S208, as in step S108, the wear-out control unit 12d acquires the allowable number of W/E cycles of dedicated block and the allowable number of W/E cycles of shared block corresponding to the current TBW from the plan line table 36 shown in FIG. 6, and supplies these values to the garbage collection control unit 12c.

In step S210, as in step S110, the garbage collection control unit 12c determines whether the average number of W/E cycles of dedicated block the allowable number of W/E cycles of dedicated block, and the average number of W/E cycles of shared block the allowable number of W/E cycles of shared block.

If the determination result in step S210 is YES, i.e., if the degrees of wear-out of both the SLC-dedicated block group 132 and the SLC/TLC-shared block group 134 are equal to or greater than the maximum allowable degree of wear-out, the garbage collection control unit 12c decreases the number of GC target candidate blocks in the SLC-dedicated block group 132 and the number of GC target candidate blocks in the SLC/TLC-shared block group 134 in step S212 (case A2). After this, in step S224, the garbage collection control unit 12c executes the garbage collection for the SLC-dedicated block group 132 and the SLC/TLC-shared block group 134. The garbage collection is executed with a block selected from the GC target candidate blocks as the garbage collection source block.

In the SLC-dedicated block group 132 and the SLC/TLC-shared block group 134, the number of free blocks to be generated through the garbage collection decreases by decreasing the number of GC target candidate blocks. Thus, as shown in FIG. 17B, the ratio of the number of blocks in the SLC-dedicated block group 132 allocated to the SLC buffer 112 to the number of blocks in the SLC/TLC-shared block group 134 allocated to the SLC buffer 112 is maintained, but the number of blocks allocated to the SLC buffer 112 decreases. Due to this, the data amount of host write to be written into the SLC buffer 112 is decreased, and the degrees of wear-out of the SLC-dedicated block group 132 and the SLC/TLC-shared block group 134 approach the maximum allowable degree of wear-out.

If the determination result in step S210 is NO, the garbage collection control unit 12c determines in step S214 whether the average number of W/E cycles of dedicated block≥the allowable number of W/E cycles of dedicated block, and the average number of W/E cycles of shared block<the allowable number of W/E cycles of shared block.

If the determination result in step S214 is YES, i.e., if the degree of wear-out of the SLC-dedicated block group 132 is equal to or greater than the maximum allowable degree of wear-out, and the degree of wear-out of the SLC/TLC-shared block group 134 is less than the maximum allowable degree of wear-out, the garbage collection control unit 12c decreases the number of GC target candidate blocks in the SLC-dedicated block group 132 and/or increases the number of GC target candidate blocks in the SLC/TLC-shared block group 134 in step S216 (case B2). After this, in step S224, the garbage collection control unit 12c executes the garbage collection for the SLC-dedicated block group 132 and the SLC/TLC-shared block group 134.

By increasing the number of GC target candidate blocks in the SLC/TLC-shared block group 134, the number of free blocks in the SLC/TLC-shared block group 134 generated through the garbage collection increases. As a result, as shown in FIG. 17C or 17D, the ratio of the number of blocks in the SLC-dedicated block group 132 allocated to the SLC buffer 112 to the number of blocks in the SLC/TLC-shared block group 134 allocated to the SLC buffer 112 decreases. FIG. 17C shows a case in which the number of GC target candidate blocks in the SLC-dedicated block group 132 decreases and the number of GC target candidate blocks in the SLC/TLC-shared block group 134 increases. In this case, the total number of blocks allocated to the SLC buffer 112 is maintained. FIG. 17D shows a case in which the number of GC target candidate blocks in the SLC-dedicated block group 132 decreases with maintaining the number of GC target candidate blocks in the SLC/TLC-shared block group 134. In addition, in this case, the ratio of the number of blocks in the SLC-dedicated block group 132 allocated to the SLC buffer 112 to the number of blocks in the SLC/TLC-shared block group 134 allocated to the SLC buffer 112 decreases.

Accordingly, the data amount of host write to be written into the SLC-dedicated block group 132 decreases, the data amount of host write to be written into the SLC/TLC-shared block group 134 increases, and the SLC/TLC-shared block group 134 is worn out more than the SLC-dedicated block group 132. As a result, the degrees of wear-out of both the SLC-dedicated block group 132 and the SLC/TLC-shared block group 134 approach the allowable degree of wear-out.

If the determination result in step S214 is NO, the garbage collection control unit 12c determines in step S218 whether the average number of W/E cycles of dedicated block<the allowable number of W/E cycles of dedicated block, and the average number of W/E cycles of shared block≥the allowable number of W/E cycles of shared block.

If the determination result in step S218 is YES, i.e., if the degree of wear-out of the SLC/TLC-shared block group 134 is equal to or greater than the maximum allowable degree of wear-out, and the degree of wear-out of the SLC-dedicated block group 132 is less than the maximum allowable degree of wear-out, the garbage collection control unit 12c increases the number of GC target candidate blocks in the SLC-dedicated block group 132 and/or decreases the number of GC target candidate blocks in the SLC/TLC-shared block group 134 in step S220 (case C2). After this, in step S224, the garbage collection control unit 12c executes the garbage collection for the SLC-dedicated block group 132 and the SLC/TLC-shared block group 134.

Figure 18A:
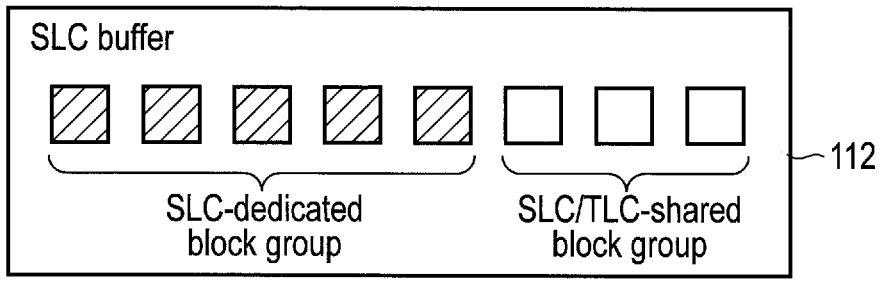
FIGS. 18A, 18B, and 18C are exemplary views illustrating a concept of a change in the configuration of the SLC buffer in the third embodiment.
Figure 18B:
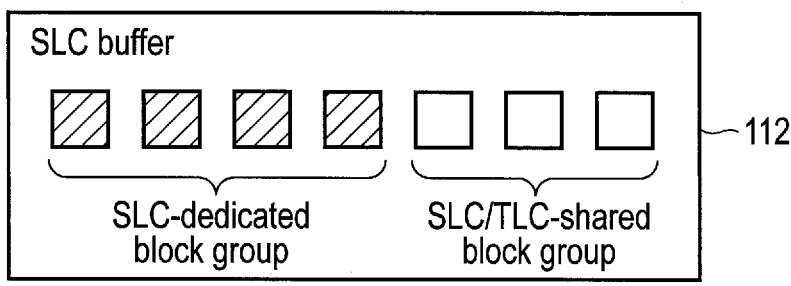

As a result, as shown in FIG. 18A or 18B, the ratio of the number of blocks in the SLC-dedicated block group 132 allocated to the SLC buffer 112 to the number of blocks in the SLC/TLC-shared block group 134 allocated to the SLC buffer 112 increases. The blocks shown in FIGS. 18A, 18B, and 18C include the active blocks and the free blocks both of the SLC-dedicated block group 132 and of the SLC/TLC-shared block group 134. FIG. 18A shows a case in which the number of GC target candidate blocks in the SLC-dedicated block group 132 increases and the number of GC target candidate blocks in the SLC/TLC-shared block group 134 decreases. In this case, the total number of blocks allocated to the SLC buffer 112 is maintained. FIG. 18B shows a case in which the number of GC target candidate blocks in the SLC/TLC-shared block group 134 decreases. In addition, in this case, the ratio of the number of blocks in the SLC/TLC-shared block group 134 allocated to the SLC buffer 112 to the number of blocks in the SLC-dedicated block group 132 allocated to the SLC buffer 112 decreases.

Accordingly, the data amount of host write to be written into the SLC-dedicated block group 132 increases, the data amount of host write to be written into the SLC/TLC-shared block group 134 decreases, and the SLC-dedicated block group 134 is worn out more than the SLC/TLC-shared block group 132. As a result, the degrees of wear-out of both the SLC-dedicated block group 132 and the SLC/TLC-shared block group 134 approach the maximum allowable degree of wear-out.

If the determination result in step S218 is NO, i.e., if the degrees of wear-out of both the SLC-dedicated block group 132 and the SLC/TLC-shared block group 134 are equal to or less than the maximum allowable degree of wear-out, the garbage collection control unit 12c increases in step S222 the number of GC target candidate blocks in the SLC-dedicated block group 132 and the number of GC target candidate blocks in the SLC/TLC-shared block (case D2). After this, in step S224, the garbage collection control unit 12c executes the garbage collection for the SLC-dedicated block group 132 and the SLC/TLC-shared block group 134.

Figure 18C:
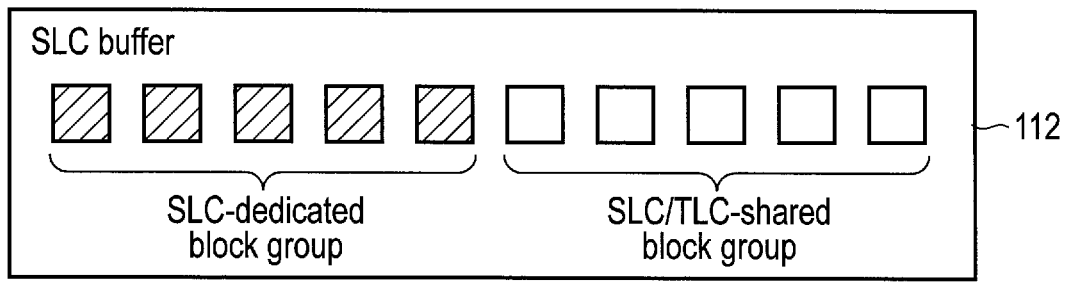

As a result, as shown in FIG. 18C, the ratio of the number of blocks in the SLC-dedicated block group 132 allocated to the SLC buffer 112 to the number of blocks in the SLC/TLC-shared block group 134 allocated to the SLC buffer 112 is maintained, but the total number of blocks allocated to the SLC buffer 112 increase. Due to this, the data amount of host write to be written into the SLC buffer 112 increases, and the throughput of host write can be further improved.

According to the third embodiment, depending on whether the actual degree of wear-out is equal to or greater than the maximum allowable degree of wear-out, by adjusting the number of GC target candidate blocks and adjusting the number of free blocks to be generated through the garbage collection, it is possible to bring the degrees of wear-out of both the SLC-dedicated block group 132 and the SLC/TLC-shared block group 134 close to the maximum allowable degree of wear-out and it is possible to realize both throughput and the amount of data that can be written.

Fourth Embodiment

With reference to FIG. 19, an example of adjusting the allocation ratio of the number of blocks in the SLC-dedicated block group 132 allocated to the SLC buffer 112 to the number of blocks in the SLC/TLC-shared block group 134 allocated to the SLC buffer 112 according to the fourth embodiment will be described. In the fourth embodiment, the allocation ratio is adjusted by adjusting garbage collection priority (GC priority) of the SLC-dedicated block group 132 and the GC priority of the SLC/TLC-shared block group 134. FIG. 19 is a flowchart illustrating an example of the process according to the fourth embodiment. The GC priority indicates how preferentially the garbage collection for the SLC-dedicated block group 132 or the SLC/TLC-shared block group 134 is executed. The higher the GC priority, the larger the number of free blocks to be generated through the garbage collection and the larger the data amount of host write.

Similar to the third embodiment, the processing of the flowchart of FIG. 19 is also executed at the time of starting the garbage collection. The allocation state of the SLC buffer 112 when the processing of the flowchart of FIG. 19 is started is the same as that of FIG. 17A. It is assumed that blocks in the SLC-dedicated block group 132 and blocks in the SLC/TLC-shared block group 134 are allocated to the SLC buffer 112 at the ratio of 1:1, as in the third embodiment. However, at the time of starting the processing of the flowchart of FIG. 19, blocks in the SLC-dedicated block group 132 and blocks in the SLC/TLC-shared block group 134 may be allocated to the SLC buffer 112 at a ratio other than 1:1.

Similarly to step S206, in step S306, the wear-out control unit 12d acquires the number of W/E cycles of the SLC-dedicated block group 132 and the number of W/E cycles of the SLC/TLC-shared block group 134 from the number of W/E cycles per block table 34. The wear-out control unit 12d obtains the average number of W/E cycles of dedicated block and the average number of W/E cycles of shared block. The wear-out control unit 12d supplies these values to the garbage collection control unit 12c. The averages of the number of W/E cycles of all blocks in the SLC-dedicated block group 132 and all blocks in the SLC/TLC-shared block group 134 are obtained, but an average of the number of W/E cycles of some blocks including at least one block defined in the second embodiment instead of all the blocks may be obtained. Furthermore, instead of the average value, a total value or a maximum value thereof may be used.

Similarly to step S208, in step S308, the wear-out control unit 12d acquires the allowable number of W/E cycles of dedicated block and the allowable number of W/E cycles of shared block corresponding to the current TBW from the plan line table 36 shown in FIG. 6, and supplies these values to the garbage collection control unit 12c.

Similarly to step S210, in step S310, the garbage collection control unit 12c determines whether the average number of W/E cycles of dedicated block the allowable number of W/E cycles of dedicated block, and the average number of W/E cycles of shared block the allowable number of W/E cycles of shared block.

If the determination result in step S310 is YES, i.e., if the degrees of wear-out of both the SLC-dedicated block group 132 and the SLC/TLC-shared block group 134 are equal to or greater than the maximum allowable degree of wear-out, the garbage collection control unit 12c executes in step S324 the garbage collection for the SLC-dedicated block group 132 and the SLC/TLC-shared block group 134 while maintaining the GC priorities of the SLC-dedicated block group 132 and the SLC/TLC-shared block group 134. When the GC priority is maintained, the number of free blocks to be generated through the garbage collection is also maintained, and the data amount of host write is also maintained, and hence the allocation ratio of the number of blocks in the SLC-dedicated block group 132 allocated to the SLC buffer 112 to the number of blocks in the SLC/TLC-shared block group 134 allocated to the SLC buffer 112 is maintained.

If the determination result in step S310 is NO, the garbage collection control unit 12c determines in step S314 whether the average number of W/E cycles of dedicated block≥the allowable number of W/E cycles of dedicated block, and the average number of W/E cycles of shared block<the allowable number of W/E cycles of shared block.

If the determination result in step S314 is YES, i.e., if the degree of wear-out of the SLC-dedicated block group 132 is equal to or greater than the maximum allowable degree of wear-out, and the degree of wear-out of the SLC/TLC-shared block group 134 is less than the maximum allowable degree of wear-out, the garbage collection control unit 12c lowers the GC priority of the SLC-dedicated block group 132, and/or raises the GC priority of the SLC/TLC-shared block group 134 in step S316 (case B3). Changing the GC priority may include changing the number of valid clusters (VCC) of the block. For instance, the GC priority of the block becomes the highest by making the VCC as extremely small as, for example, one, and the GC priority of the block becomes the lowest by making the VCC infinite. After this, in step S324, the garbage collection control unit 12c executes the garbage collection for the SLC-dedicated block group 132 and the SLC/TLC-shared block group 134. Raising the GC priority increases the number of free blocks to be generated through the garbage collection, and lowering the GC priority decreases the number of free blocks to be generated through the garbage collection.

In a case where the GC priority of the SLC-dedicated block group 132 is lowered and the GC priority of the SLC/TLC-shared block group 134 is raised in step S316, the allocation state of the SLC buffer 112 is the same as that shown in FIG. 17C. That is, the total number of blocks allocated to the SLC buffer 112 is maintained, but the ratio of an SLC-dedicated block in the SLC buffer 112 decreases, and the ratio of an SLC/TLC-shared block increases. In a case where the GC priority of the SLC-dedicated block group 132 is lowered while maintaining the GC priority of the SLC/TLC-shared block group 134, the allocation state of the SLC buffer 112 becomes the same as that shown in FIG. 17D. In addition, in this case, the ratio of the number of blocks in the SLC-dedicated block group 132 allocated to the SLC buffer 112 to the number of blocks in the SLC/TLC-shared block group 134 allocated to the SLC buffer 112 decreases.

Accordingly, the data amount of host write to be written into the SLC-dedicated block group 132 decreases, the data amount of host write to be written into the SLC/TLC-shared block group 134 increases, and the SLC/TLC-shared block group 134 is worn out more than the SLC-dedicated block group 132. As a result, the degrees of wear-out of both the SLC-dedicated block group 132 and the SLC/TLC-shared block group 134 approach the maximum allowable degree of wear-out.

If the determination result in step S314 is NO, the garbage collection control unit 12c determines in step S318 whether the average number of W/E cycles of dedicated block<the allowable number of W/E cycles of dedicated block, and the average number of W/E cycles of shared block≥the allowable number of W/E cycles of shared block.

If the determination result in step S318 is YES, i.e., if the degree of wear-out of the SLC/TLC-shared block is equal to or greater than the maximum allowable degree of wear-out, and the degree of wear-out of the SLC-dedicated block is less than the maximum allowable degree of wear-out, the garbage collection control unit 12c raises the GC priority of the SLC-dedicated block group 132, and/or lowers the GC priority of the SLC/TLC-shared block group 134 in step S320 (case C3). After this, in step S324, the garbage collection control unit 12c executes the garbage collection for the SLC-dedicated block group 132 and the SLC/TLC-shared block group 134.

In a case where the GC priority of the SLC-dedicated block group 132 is raised and the GC priority of the SLC/TLC-shared block group 134 is lowered in step S320, the allocation state of the SLC buffer 112 is the same as that shown in FIG. 18A. That is, the total number of blocks allocated to the SLC buffer 112 is maintained, but the ratio of the number of blocks in the SLC-dedicated block group 132 allocated to the SLC buffer 112 to the number of blocks in the SLC/TLC-shared block group 134 allocated to the SLC buffer 112 increases. In a case where the GC priority of the SLC/TLC-shared block group 134 is lowered while maintaining the GC priority of the SLC-dedicated block group 132 in step S320, the allocation state of the SLC buffer 112 becomes the same as that shown in FIG. 18B. In addition, in this case, the ratio of the number of blocks in the SLC-dedicated block group 132 allocated to the SLC buffer 112 to the number of blocks in the SLC/TLC-shared block group 134 allocated to the SLC buffer 112 increases.

Accordingly, the data amount of host write to be written into the SLC-dedicated block group 132 increases, the data amount of host write to be written into the SLC/TLC-shared block group 134 decreases, and the SLC-dedicated block group 132 is worn out more than the SLC/TLC-shared block group 134. As a result, the degrees of wear-out of both the SLC-dedicated block group 132 and the SLC/TLC-shared block group 134 approach the maximum allowable degree of wear-out.

If the determination in step S318 is NO, the garbage collection control unit 12c in step S324 executes the garbage collection for the SLC-dedicated block group 132 and the SLC/TLC-shared block group 134. In step S324, the GC priorities of the SLC-dedicated block group 132 and the SLC/TLC-shared block group 134 are maintained.

According to the fourth embodiment, depending on whether the actual degree of wear-out is equal to or greater than the maximum allowable degree of wear-out, by adjusting the GC priorities of the SLC-dedicated block group 132 and the SLC/TLC-shared block group 134 and thus adjusting the number of free blocks to be generated through the garbage collection, it is possible to bring the degrees of wear-out of both the SLC-dedicated block group 132 and the SLC/TLC-shared block group 134 close to the maximum allowable degree of wear-out and it is possible to realize both throughput and the amount of data that can be written.

Fifth Embodiment

Figure 20:
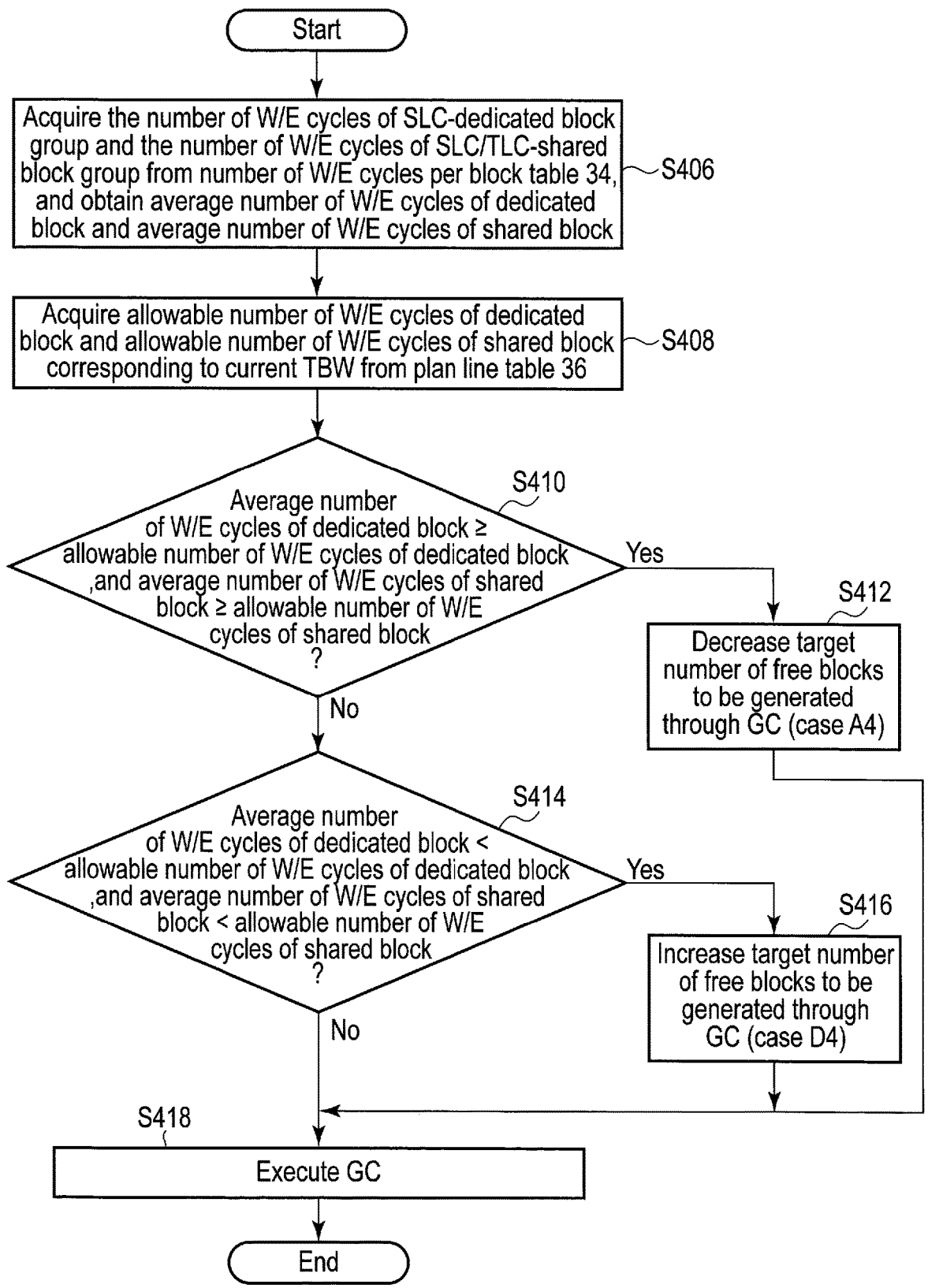
FIG. 20 is an exemplary flowchart illustrating a process of a fifth embodiment for adjusting the number of free blocks targeted to be generated through the garbage collection.

With reference to FIGS. 20 and 21, an example of adjusting the allocation ratio of the number of blocks in the SLC-dedicated block group 132 allocated to the SLC buffer 112 to the number of blocks in the SLC/TLC-shared block group 134 allocated to the SLC buffer 112 according to a fifth embodiment will be described. In the fifth embodiment, the allocation ratio is adjusted by adjusting the target number of free blocks to be generated through the garbage collection. FIG. 20 is a flowchart illustrating an example of the process according to the fifth embodiment, and FIGS. 21A, 21B, and 21C show the concept of a state change of the SLC buffer 112.

The processing of the flowchart of FIG. 20 is also executed at the time of starting the garbage collection. FIG. 21A shows the allocation state of the SLC buffer 112 when the processing of the flowchart of FIG. 20 is started. The blocks shown in FIGS. 21A to 21C include active blocks and free blocks both of the SLC-dedicated block group 132 and of the SLC/TLC-shared block group 134. It is assumed that at this time, blocks in the SLC-dedicated block group 132 and blocks in the SLC/TLC-shared block group 134 are allocated to the SLC buffer 112 at the ratio of 1:1, as in the first embodiment. However, at the time of starting the processing of the flowchart of FIG. 20, blocks in the SLC-dedicated block group 312 and blocks in the SLC/TLC-shared block group 134 may be allocated to the SLC buffer 112 at a ratio other than 1:1.

In step S406, as in step S206, the wear-out control unit 12d acquires the number of W/E cycles of the SLC-dedicated block group 132 and the number of W/E cycles of the SLC/TLC-shared block group 134 from the number of W/E cycles per block table 34. The wear-out control unit 12d obtains the average number of W/E cycles of dedicated block and the average number of W/E cycles of shared block. The wear-out control unit 12d supplies these values to the garbage collection control unit 12c. The averages of the number of W/E cycles of all blocks in the SLC-dedicated block group 132 and all blocks in the SLC/TLC-shared block group 134 are obtained, but an average of the number of W/E cycles of some blocks including at least one block defined in the second embodiment instead of all the blocks may be obtained. Furthermore, instead of the average value, a total value or a maximum value thereof may be used.

In step S408, as in step S208, the wear-out control unit 12d acquires the allowable number of W/E cycles of dedicated block and the allowable number of W/E cycles of shared block corresponding to the current TBW from the plan line table 36 shown in FIG. 6, and supplies these values to the garbage collection control unit 12c.

In step S410, as in step S210, the garbage collection control unit 12c determines whether the average number of W/E cycles of dedicated block the allowable number of W/E cycles of dedicated block, and the average number of W/E cycles of shared block the allowable number of W/E cycles of shared block.

If the determination result in step S410 is YES, i.e., if the degrees of wear-out of both the SLC-dedicated block group 132 and the SLC/TLC-shared block group 134 are equal to or greater than the maximum allowable degree of wear-out, the garbage collection control unit 12c decreases in step S412 the target number of free blocks to be generated through the garbage collection (case A4). After this, in step S418, the garbage collection control unit 12c executes the garbage collection for the SLC-dedicated block group 132 and the SLC/TLC-shared block group 134.

In a case where the number of free blocks to be generated through the garbage collection decreases, as shown in FIG. 21B, the total number of blocks allocated to the SLC buffer 112, that is, the size of the SLC buffer 112 decreases. Due to this, the data amount of host write to be written into the SLC buffer 112 is decreased, and the degrees of wear-out of both the SLC-dedicated block group 132 and the SLC/TLC-shared block group 134 approach the maximum allowable degree of wear-out.

If the determination result in step S410 is NO, the garbage collection control unit 12c determines in step S414 whether the average number of W/E cycles of dedicated block<the allowable number of W/E cycles of dedicated block, and the average number of W/E cycles of shared block<the allowable number of W/E cycles of shared block.

If the determination result in step S414 is YES, i.e., if the degrees of wear-out of both the SLC-dedicated block and the SLC/TLC-shared block are less than the maximum allowable degree of wear-out, the garbage collection control unit 12c increases in step S416 the target number of free blocks to be generated through the garbage collection (case D4). After this, in step S418, the garbage collection control unit 12c executes the garbage collection for the SLC-dedicated block group 132 and the SLC/TLC-shared block group 134.

In a case where the number of free blocks to be generated through the garbage collection increases, as shown in FIG. 21C, the total number of blocks allocated to the SLC buffer 112, that is, the size of the SLC buffer 112 increases. Due to this, the data amount of host write to be written into the SLC buffer 112 increases, and the throughput of host write is improved.

If the determination result in step S414 is NO, the garbage collection control unit 12c executes in step S418 the garbage collection for the SLC-dedicated block group 132 and the SLC/TLC-shared block group 134 while maintaining the target number of free blocks to be generated through the garbage collection.

According to the fifth embodiment, depending on whether the actual degree of wear-out is equal to or greater than the maximum allowable degree of wear-out, by adjusting the target number of free blocks to be generated through the garbage collection, it is possible to bring the degrees of wear-out of both the SLC-dedicated block group 132 and the SLC/TLC-shared block group 134 close to the maximum allowable degree of wear-out and it is possible to realize both throughput and the amount of data that can be written.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a non-volatile memory including a plurality of blocks, the plurality of blocks including blocks in a first block group and blocks in a second block group; and
   a controller configured to:
   perform a first write operation for at least one of the blocks in the first block group and not perform a second write operation for any one of the blocks in the first block group throughout a lifetime of the memory system; and
   perform the first write operation and the second write operation for the blocks in the second block group, wherein
   a total capacity of the blocks in the first block group is fixed and a total capacity of the blocks in the second block group is fixed,
   a first number of bits are written into a memory cell of the non-volatile memory in the first write operation, and
   a second number of bits are written into a memory cell of the non-volatile memory in the second write operation, the second number being larger than the first number, and the controller is further configured to:
allocate, based on a degree of wear-out of at least one of the plurality of blocks, one or more blocks in the first block group or the second block group to a buffer of a write operation; and
write data received from an external device into the buffer in the first write operation.

2. The memory system according to claim 1, wherein the controller is configured to:
allocate the one or more blocks to the buffer such that a degree of wear-out of at least one block in the first block group does not reach a first degree of wear-out before a total amount of data Which are received from the external device and Written into the non-volatile memory reaches a first amount of data, and a degree of wear-out of at least one block in the second block group does not reach a second degree of wear-out before the total amount of data which are received from the external device and written into the non-volatile memory reaches the first amount of data.

3. The memory system according to claim 1, wherein the controller is configured to:
determine a third number of blocks in the first block group which are to be allocated to the buffer at a first time and a fourth number of blocks in the second block group which are to be allocated to the buffer at the first time such that a degree of wear-out of at least one block in the first block group does not reach a first degree of wear-out before a total amount of data which are received from the external device and written into the non-volatile memory reaches a first amount of data, and a degree of wear-out of at least one block in the second block group does not reach a second degree of wear-out before the total amount of data which are received from the external device and written into the non-volatile memory reaches the first amount of data;
allocate the third number of blocks in the first block group to the buffer; and
allocate the fourth number of blocks in the second block group to the buffer.

4. The memory system according to claim 3, wherein the third number is a number of blocks in the first block group which are to be allocated to the buffer at the first time and into which data received from the external device is to be written in the first write operation, and
the fourth number is a number of blocks in the second block group which are to be allocated to the buffer at the first time and into which data received from the external device is to be written in the first write operation.

5. The memory system according to claim 3, wherein the third number is a sum of a number of blocks in the first block group in which at least a piece of valid data is included and a number of blocks in the first block group in which valid data is not included, and
the fourth number is a sum of a number of blocks in the second block group in which at least a piece of valid data is included and a number of blocks in the second block group in which valid data is not included.

6. The memory system according to claim 3, wherein the controller is further configured to:
at a second time later than the first time,
in a case where the degree of wear-out of the at least one block in the first block group is lower than a third degree of wear-out, the third degree being lower than the first degree, determine a fifth number of blocks in the first block group which are to be allocated to the buffer, the fifth number being greater than the third number, and allocate the fifth number of blocks in the first block group to the buffer;
in a case where the degree of wear-out of the at least one block in the first block group is higher than the third degree of wear-out, determine a sixth number of blocks in the first block group which are to be allocated to the buffer, the sixth number being smaller than the third number, and allocate the sixth number of blocks in the first block group to the buffer;
in a case where the degree of wear-out of the at least one block in the second block group is lower than a fourth degree of wear-out, the fourth degree being lower than the second degree, determine a seventh number of blocks in the second block group which are to be allocated to the buffer, the seventh number being greater than the fourth number, and allocate the seventh number of blocks in the second block group to the buffer; and
in a case where the degree of wear-out of the at least one block in the second block group is higher than the fourth degree of wear-out, determine an eighth number of blocks in the second block group which are to be allocated to the buffer, the eighth number being smaller than the fourth number, and allocate the eighth number of blocks in the second block group to the buffer.

7. The memory system according to claim 1, wherein an allowable upper limit of a number of write/erase cycles of each of the blocks in the first block group is larger than an allowable upper limit of a number of write/erase cycles of each of the blocks in the second block group.

8. A memory system, comprising:
a non-volatile memory including a plurality of blocks, the plurality of blocks including blocks in a first block group and blocks in a second block group; and
a controller configured to:
perform a first write operation for at least one of the blocks in the first block group and not perform a second write operation for any one of the blocks in the first block group; and
perform the first write operation and the second write operation for the blocks in the second block group, wherein
a total capacity of the blocks in the first block group is fixed and a total capacity of the blocks in the second block group is fixed,
a first number of bits are written into a memory cell of the non-volatile memory in the first write operation, and
a second number of bits are written into a memory cell of the non-volatile memory in the second write operation, the second number being larger than the first number, and
the controller is further configured to:
determine, based on a degree of wear-out of at least one of the plurality of blocks, a number of blocks in the first block group which are to be allocated to a buffer of a write operation and a number of blocks in the second block group which are to be allocated to the buffer;
allocate the determined number of blocks in the first block group or the second block group to the buffer; and
write data received from an external device into the buffer in the first write operation.

9. The memory system according to claim 8, wherein the controller is configured to:

determine, based on the degree of wear-out of the at least one of the plurality of blocks, a third number of blocks in the first block group which are to be allocated to the buffer at a first time and a fourth number of blocks in the second block group which are to be allocated to the buffer at the first time;

allocate the third number of blocks in the first block group to the buffer; and allocate the fourth number of blocks in the second block group to the buffer.

10. The memory system according to claim 9, wherein the third number is a number of blocks in the first block group which are to be allocated to the buffer at the first time and into which data received from the external device is to be written in the first write operation, and the fourth number is a number of blocks in the second block group which are to be allocated to the buffer at the first time and into which data received from the external device is to be written in the first write operation.

11. The memory system according to claim 9, wherein the third number is a sum of a number of blocks in the first block group in which at least a piece of valid data is included and a number of blocks in the first block group in which valid data is not included, and the fourth number is a sum of a number of blocks in the second block group in which at least a piece of valid data is included and a number of blocks in the second block group in which valid data is not included.

12. The memory system according to claim 9, wherein the controller is further configured to:

determine, based on at least one of (A) a degree of wear-out of at least one block in the first block group and (B) a degree of wear-out of at least one block in the second block group, a number of free blocks in the first block group to be generated through a garbage collection for the first block group or a number of free blocks in the second block group to be generated through a garbage collection for the second block group;

execute the garbage collection for the first block group to generate the determined number of free blocks in the first block group;

execute the garbage collection for the second block group to generate the determined number of free blocks in the second block group.

13. The memory system according to claim 9, wherein the controller is further configured to:

determine, based on at least one of (A) a degree of wear-out of at least one block in the first block group and (B) a degree of wear-out of at least one block in the second block group, a number of candidate blocks of garbage collection target for the first block group;

determine, based on at least one of (A) the degree of wear-out of the at least one block in the first block group and (B) the degree of wear-out of the at least one block in the second block group, a number of candidate blocks of garbage collection target for the second block group;

execute a garbage collection for a block selected from the candidate blocks for the first block group; and execute a garbage collection for a block selected from the candidate blocks for the second block group.

14. The memory system according to claim 9, wherein the controller is further configured to:

determine, based on at least one of (A) a degree of wear-out of at least one block in the first block group and (B) a degree of wear-out of at least one block in the second block group, which of a garbage collection for the first block group and a garbage collection for the second block group to be given priority for executing; and execute the garbage collection for the first block group or the second block group which is given the priority to generate a free block in the first block group or the second block group.

15. The memory system according to claim 9, wherein the controller is further configured to:

at a second time later than the first time, in a case where a degree of wear-out of at least one block in the first block group is lower than a first degree of wear-out, determine a fifth number of blocks in the first block group which are to be allocated to the buffer, the fifth number being greater than the third number, and allocate the fifth number of blocks in the first block group to the buffer;

in a case where the degree of wear-out of the at least one block in the first block group is higher than the first degree of wear-out, determine a sixth number of blocks in the first block group which are to be allocated to the buffer, the sixth number being smaller than the third number, and allocate the sixth number of blocks in the first block group to the buffer;

a case where a degree of wear-out of at least one block in the second block group is lower than a second degree of wear-out, determine a seventh number of blocks in the second block group which are to be allocated to the buffer, the seventh number being greater than the fourth number, and allocate the seventh number of blocks in the second block group to the buffer; and in a case where the degree of wear-out of the at least one block in the second block group is higher than the second degree of wear-out, determine an eighth number of blocks in the second block group which are to be allocated to the buffer, the eighth number being smaller than the fourth number, and allocate the eighth number of blocks in the second block group to the buffer.

16. A method of writing data into a non-volatile memory including a plurality of blocks, the plurality of blocks including blocks in a first block group and blocks in a second block group, a total capacity of the blocks in the first block group being fixed, and a total capacity of the blocks in the second block group being fixed, the method comprising:

determining, based on a degree of wear-out of at least one of the plurality of blocks, a number of blocks in the first block group which are to be allocated to a buffer of a write operation and a number of blocks in the second block group which are to be allocated to the buffer;

allocating the determined number of blocks in the first block group or the second block group to the buffer of a write operation; and writing data received from an external device into the buffer in a first write operation, wherein data is written into at least one of the blocks in the first block group in the first write operation and not written in any one of the blocks in the second write operation, data is written into the blocks in the second block group in the first write operation and the second write operation, a first number of bits are written into a memory cell of the non-volatile memory in the first write operation, a second number of bits are written into a memory cell of the non-volatile memory in the second write operation, and the second number is larger than the first number.

17. The method according to claim 16, wherein the determining comprises determining, based on the degree of wear-out of the al least one of the plurality of blocks, a third number of blocks in the first block group which are to be allocated to the buffer at a first time and a fourth number of blocks in the second block group which are to be allocated to the buffer at the first time, and the allocating comprises, allocating the third number of blocks in the first block group to the buffer, and allocating the fourth number of blocks in the second block group to the buffer.

18. The method according to claim 17, further comprising:

at a second time later than the first time, in a case where a degree of wear-out of at least one block in the first block group is lower than a first degree of wear-out, determining a fifth number of blocks in the first block group which are to be allocated to the buffer, the fifth number being greater than the third number, and allocating the fifth number of blocks in the first block group to the buffer;

in a case where the degree of wear-out of the at least one block in the first block group is higher than the first degree of wear-out, determining a sixth number of blocks in the first block group which are to be allocated to the buffer, the sixth number being smaller than the third number, and allocating the sixth number of blocks in the first block group to the buffer;

in a case where a degree of wear-out of at least one block in the second block group is lower than a second degree of wear-out, determining a seventh number of blocks in the second block group which are to be allocated to the buffer, the seventh number being greater than the fourth number, and allocating the seventh number of blocks in the second block group to the buffer; and in a case where the degree of wear-out of the at least one block in the second block group is higher than the second degree of wear-out, determining an eighth number of blocks in the second block group which are to be allocated to the buffer, the eighth number being smaller than the fourth number, and allocating the eighth number of blocks in the second block group to the buffer.

19. The method of claim 16, further comprising:

determining, based on at least one of (A) a degree of wear-out of at least one block in the first block group and (B) a degree of wear-out of at least one block in the second block group, a number of free blocks in the first block group to be generated through a garbage collection for the first block group or a number of free blocks in the second block group to be generated through a garbage collection for the second block group;

executing the garbage collection for the first block group to generate the determined number of free blocks in the first block group;

executing the garbage collection for the second block group to generate the determined number of free blocks in the second block group.

20. The method according to claim 16, further comprising:

determining, based on the at least one of (A) a degree of wear-out of at least one block in the first block group and (B) a degree of wear-out of at least one block in the second block group, a number of candidate blocks of garbage collection target in the first block group or a number of candidate blocks of garbage collection target in the second block group;

executing a garbage collection for a block selected from the candidate blocks for the first block group to generate a free block in the first block group;

executing a garbage collection for a block selected from the candidate blocks for the second block group to generate a free block in the second block group.

21. The method according to claim 16, further comprising:

determining, based on at least one of (A) a degree of wear-out of at least one block in the first block group and (B) a degree of wear-out of at least one block in the second block group, which of a garbage collection for the first block group and a garbage collection for the second block group to be given priority for executing;

executing the garbage collection for the first block group or the second block group which is given the priority to generate free blocks in the first block group or the second block group.

* * * * *